US011740256B2

(12) United States Patent
Dority et al.

(10) Patent No.: US 11,740,256 B2
(45) Date of Patent: Aug. 29, 2023

(54) SYSTEM, DEVICE AND METHODS OF SAMPLE PROCESSING USING SEMICONDUCTOR DETECTION CHIPS

(71) Applicant: Cepheid, Sunnyvale, CA (US)

(72) Inventors: Douglas B Dority, Santa Cruz, CA (US); Jonathan Siegrist, Campbell, CA (US); Ronald Chang, Redwood City, CA (US)

(73) Assignee: Cepheid, Sunnyvale, CA (US)

(*) Notice: Subject to any disclaimer, the term of this patent is extended or adjusted under 35 U.S.C. 154(b) by 130 days.

(21) Appl. No.: 16/577,650

(22) Filed: Sep. 20, 2019

(65) Prior Publication Data
US 2020/0116750 A1 Apr. 16, 2020

Related U.S. Application Data

(60) Provisional application No. 62/734,079, filed on Sep. 20, 2018.

(51) Int. Cl.
*B01L 3/00* (2006.01)
*G01N 35/10* (2006.01)

(52) U.S. Cl.
CPC .......... *G01N 35/1097* (2013.01); *B01L 3/502* (2013.01); *B01L 2200/04* (2013.01);
(Continued)

(58) Field of Classification Search
CPC . G01N 35/1097; B01L 3/502; B01L 2200/04; B01L 2200/10; B01L 2300/06;
(Continued)

(56) References Cited

U.S. PATENT DOCUMENTS 5,922,591 A 7/1999 Anderson et al.
6,220,870 B1 * 4/2001 Barabi ............... H01R 13/2485
439/71

(Continued)

FOREIGN PATENT DOCUMENTS

EP 1542000 A1 6/2005
WO 2014/028378 A2 2/2014
WO WO-2016161385 A1 * 10/2016 ............. B01L 3/563

OTHER PUBLICATIONS

Geidel S, et al. Integration of an Optical Ring Resonator Biosensor into a Self-Contained Microfluidic Cartridge with Active, Single-Shot Micropumps. Micromachines (Basel). 2016;7(9):153. Published Sep. 13, 2016. doi:10.3390/mi7090153 (Year: 2016).*

(Continued)

*Primary Examiner* — Matthew D Krcha
*Assistant Examiner* — Tingchen Shi
(74) *Attorney, Agent, or Firm* — Kilpatrick Townsend & Stockton LLP

(57) ABSTRACT

Systems for processing a fluid sample to facilitate analysis with a semiconductor detection chip are provided herein. Such systems can include a sample processing cartridge coupleable with a chip carrier device configured for transport of the processed fluid sample from the sample cartridge. The chip carrier device can include one or more fluid channels extending between fluid-tight couplings attachable to transfer ports of the sample processing cartridge. The chip carrier device can include multiple portions or adapters, including a fluid sample portion, a flowcell portion and a chip carrier. Also provided are methods of preparing and transporting a fluid sample from a sample cartridge into a chip carrier device for analysis with a semiconductor detection chip carried within the chip carrier device.

26 Claims, 21 Drawing Sheets

(52) U.S. Cl.
CPC ....... *B01L 2200/10* (2013.01); *B01L 2300/06* (2013.01); *B01L 2300/0627* (2013.01); *B01L 2300/0809* (2013.01); *B01L 2300/12* (2013.01); *B01L 2400/06* (2013.01)

(58) Field of Classification Search
CPC ......... B01L 2300/0627; B01L 2300/12; B01L 2400/06
See application file for complete search history.

(56) References Cited

U.S. PATENT DOCUMENTS

| | | | |
|---|---|---|---|
| 6,374,684 B1* | 4/2002 | Dority | G01N 35/1097 73/864.81 |
| 6,818,185 B1* | 11/2004 | Petersen | B01L 3/502 435/287.7 |
| 2003/0162304 A1 | 8/2003 | Dority et al. | |
| 2004/0132059 A1* | 7/2004 | Scurati | B01L 3/502715 435/6.18 |
| 2011/0229375 A1 | 9/2011 | Ehrenpfordt | |
| 2012/0061239 A1* | 3/2012 | Elibol | G01N 27/283 204/406 |
| 2015/0004132 A1* | 1/2015 | Robinson | A61K 39/21 424/85.2 |
| 2015/0041324 A1 | 2/2015 | Jeon | |
| 2017/0021356 A1 | 1/2017 | Dority et al. | |
| 2017/0023281 A1 | 1/2017 | Fromm et al. | |
| 2018/0031592 A1 | 2/2018 | Dority | |

OTHER PUBLICATIONS

International Search Report and Written Opinion in PCT/US2019/052254, dated Jan. 30, 2020, 25 pages.

Benavides, et al., National Technology and Engineering Solutions of Sandia LLC, 2002.

Alveringh, et al. "Universal modular fluidic and electronic interfacing platform for microfluidic devices." In Proceedings of the 3rd Conference on MicroFluidic Handling Systems (MFHS 2017), pp. 106-109. 2017.

\* cited by examiner

Section A-A

Section B-B

Section D-D

Section E-E

SYSTEM, DEVICE AND METHODS OF SAMPLE PROCESSING USING SEMICONDUCTOR DETECTION CHIPS

CROSS-REFERENCES TO RELATED APPLICATIONS

This application claims priority to U.S. Provisional Application No. 62/734,079 filed on Sep. 20, 2018, which is incorporated herein by reference in its entirety.

This application is generally related to PCT Application No. US 2016/025748 entitled "Fluidic Bridge Device and Sample Processing Methods" filed April 2016; U.S. Pat. No. 6,374,684 entitled "Fluid Control and Processing System," filed Aug. 25, 2000; U.S. Pat. No. 8,048,386 entitled "Fluid Processing and Control," filed Feb. 25, 2002; and US 2017/0023281 entitled "Thermal Control Device and Methods of Use" filed Jul. 22, 2016; each of which is incorporated herein by reference in its entirety for all purposes.

BACKGROUND OF THE INVENTION

The present invention relates generally to fluid manipulation and, more particularly, to a device, system and method for processing a sample and facilitating the transport of the prepared sample for further processing with a semiconductor chip device, in particular a semiconductor detection chip.

In recent years, there has been considerable development in the use of semiconductor chips in performing fluid sample analysis (e.g. testing of clinical, biological, or environmental samples). One continual challenge has been in performing processing of the fluid sample in preparation for analysis with the semiconductor chips. Processing of such fluid samples typically involves a series of processing steps, which can include chemical, optical, electrical, mechanical, thermal, or acoustical processing of the fluid samples. Whether incorporated into a bench-top instrument, a portable analyzer, a disposable cartridge, or a combination thereof, such processing typically involves complex fluidic assemblies and processing algorithms. Developing a robust fluid sample processing system can be extremely challenging and costly.

Conventional approaches for processing fluid samples typically involves substantial manual operation, while more recent approaches have sought to automate many of the processing steps and can include the use of sample cartridges that employ a series of regions or chambers each configured for subjecting the fluid sample to a specific processing step. As the fluid sample flows through the cartridge sequentially from region or chamber to a subsequent region or chamber of the cartridge, the fluid sample undergoes the processing steps according to a specific protocol. Such systems, however, generally include an integrated means of analysis, and are not typically amenable to use with a semiconductor chip. The standard approach of utilizing semiconductor detection chips, such as "lab on a chip" devices, generally requires a considerably complex, time-consuming and costly endeavor, requiring the chip be incorporated into a conventional chip package and then incorporated into much larger systems utilizing conventional fluidic transport means to transport a fluid sample to the chip device. The fluid sample is typically prepared by one or more entirely separate systems (often including manual interaction) and then pipetted into the fluid transport system to be supplied to the chip package. These challenges associated with pre and post testing processes often minimize the advantages and benefits of such "lab on a chip" devices and present a practical barrier to their widespread use and acceptance in diagnostic testing.

Thus, there is a need for developing a device that performs a wide range of sample processing steps in a robust and consistent manner and that is compatible for use with a semiconductor chip. There is further a need for such methods and devices that allow for seamless integration with existing technologies and to improve efficiency and throughput in fluid sample processing and handling and overcome the challenges described above.

BRIEF SUMMARY OF THE INVENTION

The present invention provides devices, methods and systems that facilitate processing of a fluid sample and transport of the processed sample for analysis with a semiconductor detection chip (also referred to as "chip", "detection chip" or "semiconductor chip"). In one aspect, such methods and systems utilize existing sample processing technologies to perform one or more processing steps, then transport the processed fluid sample to interface with a semiconductor chip and perform further processing with a semiconductor chip. Such further processing typically includes analysis of a target analyte with a semiconductor detection chip. In some embodiments, the invention further provides means for any of: powering the chip, communicating, programming or signal processing when performing testing with a semiconductor detection chip.

In one aspect, the device is configured for use with any of a plurality of differing types of chips and allows for a plug-n-play approach to utilizing semiconductor detection chips. For example, the device allows the system to be used as a platform to readily accept and utilize existing "lab on a chip" devices in a more cost effective manner. It is appreciated that the device can be configured for use with any type of semiconductor detection chip, including but not limited to CMOS, ion-sensitive FET (ISFET), bulk acoustic, non-bulk acoustic, piezo-acoustic, and pore array sensor chips. Further, the semiconductor detection chip can be adapted for use in an open package to any of the many JDEC standards, including but not limited to quad-flat no lead (QFN), dual in-line, and BGA array. Alternatively, the semiconductor detection chip can be mounted directly to the PCB as a chip-on-board assembly. In some embodiments, the semiconductor detection chip serves as a biosensor that combines a biologically sensitive element with a physical or chemical transducer to selectively (and in some embodiments, quantitatively) detect the presence of specific analytes in a fluid sample. In some embodiments, the chip provides an electrical or optical output signal in response to a physical, chemical, or optical input signal. The device can further include features for powering, communication, signal integration, and data flow when performing testing with the detection chip and can include software to facilitate use of the chip within the system. The device can further be configured to facilitate testing with chip devices by utilizing various "on board" features, or can be configured for use with various "in board" or "off board features", as described in further detail below.

In one aspect, the invention pertains to a system for processing and analyzing a fluid sample utilizing a sample cartridge and a chip carrier device coupled thereto. Such systems can include: a sample cartridge configured to hold a biological sample, the sample cartridge comprising a plurality of processing chambers fluidically interconnected by a moveable valve body; a module for performing sample preparation, the module having a cartridge receiver adapted to receive and removably couple with the sample cartridge; and a chip carrier device having a fluidic interface configured for fluidically coupling with the sample cartridge. The fluidic interface is in fluid communication with a flowcell chamber of the device which is in fluid communication with a semiconductor detection chip when carried within the chip carrier of the device. The chip carrier device includes an electrical interface configured for powering the chip when supported within the carrier of the device. The electrical interface can further be configured to facilitate communication with the chip, as well as signal processing and programing.

In some embodiments, the chip carrier device can include various chip-on-board features, such as any of those described herein. The chip carrier device includes: a fluid sample adapter, a flowcell adapter, and a chip carrier components. The fluidic interface is configured for fluidically coupling with the sample cartridge, the fluidic interface being in fluid communication with a first set of ports of the fluid sample adapter via a fluidic path. The flowcell adapter is coupleable with the fluid sample adapter, the flowcell adapter defining the flowcell chamber in fluid communication with the fluid sample adapter when coupled thereto via one or more flowcell ports of the flowcell adapter. The chip carrier is coupleable with or integrated with the flowcell adapter and includes the carrier portion configured for supporting a semiconductor chip. The chip carrier device can further include an electrical interface electrically connected to the carrier portion so as to power the chip when supported within the chip carrier. The chip carrier device can include various features "on board," including any of a filter, pre-PCR chamber, a sonication chamber, valve/seats, thermocycling chamber, a magnetic separator, optical interrogation, opto-link, RF, magnetic or any feature or capabilities associated with testing with chip devices.

In some embodiments, the device can be configured for use with various "in board" features of the system, for example, the chip carrier device can engage with an interface or separate device of the system configured for performing various functions, which may include but is not limited to components for sample processing, thermal cycling, communication, testing, signal processing, etc. Such a system can include an electrical interface or various other components that are separate from, but interface with the chip carrier device.

In some embodiments, the chip carrier device is configured for use with various "off board" features, for example, the chip carrier device can facilitate transport to an external device or interface or facilitate transport of prepared fluid sample to a portion of a chip that is interfaced with one or more external off-board components (e.g. thermal cycling, electro interface, detection interface). In some embodiments, the device can bridge or link to a standalone device or module, so as to front-end a detection device, such as a MALDI-TOF, mass spectrometer, NMRI or other such detection device.

In some embodiments, the sample cartridge employs a rotary valve configuration to control fluidic movement within the cartridge that allows for selective fluidic communication between a fluid sample processing region and a plurality of chambers in the cartridge. Non-limiting exemplary chambers can include, a sample chamber, a reagent chamber, a waste chamber, a wash chamber, a lysate chamber, an amplification chamber, and a reaction chamber. The fluid flow among the fluid sample processing region and the chambers is controlled by adjusting the position of the rotary valve. In this way, the metering and distribution of fluids in the cartridge can be varied depending on the specific protocol, which allows sample preparation to be adaptable to different protocols such as may be associated with a particular sample type for different types of analysis or different types of samples. For example, the sample cartridge can include a means for cell lysis, e.g., a sonication means so that bacteria and cells in a fluid sample to be analyzed can be lysed. Additional lysis means suitable for use with the instant invention are well known to persons of skill in the art, and can include, chemical lysis, mechanical lysis, and thermal lysis. In some embodiments, the sample includes bacteria, eukaryotic cells, prokaryotic cells, or viral particles.

In some embodiments, sample processing comprises sample processing steps that are performed from initial sample preparation steps, intermediate processing steps, and further processing steps to facilitate a detection of a target analyte in the biological sample with the semiconductor chip. For example, sample processing can include preliminary preparation steps, such as filtering, grinding, mincing, concentrating, trapping debris or purifying a rough sample, or steps for fragmenting of DNA or RNA of the target analyte, such as by sonication or other mechanical or chemical means. Sample processing can include various intermediate processing steps, such as filtering, chromatography, or further processing of nucleic acids in the sample, including but not limited to chromatography, bisulfite treatment, reverse transcription, amplification, hybridization, ligation, or fragmentation of DNA or RNA. Sample processing may further include final processing steps, such as final amplification, hybridization, sequencing, chromatographic analysis, filtering and mixing with reagents for a reaction to detect the target analyte, which detection can include optical, chemical and/or electrical detection. In some embodiments, the sample processing device is configured to perform initial and/or intermediate processing steps, while the semiconductor chip disposed within the device is configured to perform final processing, such as any of those described herein or as would be known to one of skill in the art of target analyte detection. In some embodiments, the sample processing device is configured to perform at least a first step in the overall sample processing and transport of the fluid sample to the semiconductor chip to perform at least a subsequent step in the process, which can include detection of the target analyte. In another embodiment, the fluid sample can be transported from the semiconductor chip back to the sample processing device for additional processing. In some embodiments, to enable additional new or enhanced functionality, one or more features that provide sample processing and/or sample preparation capabilities amenable to silicon-based technologies can be included on the silicon chip. For example, the chip could include one or more features for more refined fluidic manipulation, further refined sample processing, or any compatible sample processing and/or preparation steps. Such technologies and functionalities could include but are not limited to: electrophoretic-based separation; fluidic pumping; and electrowetting-based fluidic manipulation, including droplet generation or pumping, flow sensors, and the like. It is appreciated that these chip features could be included in any of the embodiments described herein, and further that the chip carrier can be adapted for use with such chip features.

In some embodiments, the sample processing device can be a fluid control and processing system for controlling fluid flow among a plurality of chambers within a cartridge, the cartridge comprising a housing including a valve body having a fluid sample processing region continuously coupled fluidically with a fluid displacement chamber. The fluid displacement chamber is depressurizable to draw fluid into the fluid displacement chamber and pressurizable to expel fluid from the fluid displacement chamber. The fluid sample processing region includes a plurality of fluid transfer ports each fluidically coupled with one of a plurality of external ports of the valve body. The fluid displacement chamber is fluidically coupled with at least one of the external ports. The valve body is adjustable with respect to the plurality of chambers within the housing to allow the external ports to be placed selectively in fluidic communication with the plurality of chambers. In some embodiments, the valve body is adjustable with respect to the housing having multiple chambers, to place one external port at a time in fluidic communication with one of the chambers.

In some embodiments of the cartridge, the fluid sample processing region can be disposed between the fluid displacement chamber and at least one fluid transfer port. The term "fluid processing region" refers to a region in which a fluid sample is subject to processing including, without limitation, chemical, optical, electrical, mechanical, thermal, or acoustical processing. For example, chemical processing may include a chemical treatment, a change in pH, or an enzymatic treatment; optical processing may include exposure to UV or IR light; electrical processing may include electroporation, electrophoresis, or isoelectric focusing; mechanical processing may include mixing, filtering, pressurization, grinding or cell disruption; thermal processing may include heating or cooling from ambient temperature; and acoustical processing may include the use of ultrasound (e.g. ultrasonic lysis). In some embodiments, the fluid processing region may include an active member, such as a filter, to facilitate processing of the fluid. Non-limiting exemplary active members that are suitable for use with the instant invention include a microfluidic chip, a solid phase material, a filter or a filter stack, an affinity matrix, a magnetic separation matrix, a size exclusion column, a capillary tube, or the like. Suitable solid phase materials include, without limitation, beads, fibers, membranes, filter paper, lysis paper impregnated with a lysing agent, glass wool, polymers, or gels. In some embodiments, the fluid processing region is used to prepare a sample for further processing, for instance, in a semiconductor chip device fluidly coupled with the fluid sample processing device. Additional active members suitable for use with the instant invention are well known to persons of skill in the art. In some embodiments, an energy transmitting member is operatively coupled with the fluid sample processing region for transmitting energy thereto to process fluid contained therein. In some embodiments, the valve body includes a crossover channel, and the valve body is adjustable with respect to the plurality of chambers to place the crossover channel in fluidic communication with two of the chambers concurrently. The cartridge housing includes one or more branches that extend to one or more transfer ports to which a reaction vessel can be attached so as to facilitate transfer of fluid sample from a chamber of the cartridge into the reaction vessel. In some embodiments, the reaction vessel extends from the housing of the cartridge. These aspects can be understood further by referring to U.S. Pat. No. 8,048, 386. It is understood that fluid may flow in either direction into or out of the transfer ports in various embodiments fluid flow is not limited in any particular direction. For example, in an embodiment having a pair of transfer ports, air may be pumped into or evacuated from one of the pair of transfer ports to facilitate flow of the fluid sample into a conduit of the reaction vessel through the fluid transfer port.

In some embodiments, chip carrier device includes fluid sample adapter having a pair of fluid channels have a cross-sectional lumen area that does not substantially vary from each other. The cross-sectional area of each of the fluid channels remains a substantially constant size and shape between respective fluid-tight couplings. In some embodiments, the pair of fluid channels are spaced apart and dimensioned so as to be fittingly received within two corresponding transfer ports in a sample cartridge housing. In some embodiments, the fluid sample adapter can include a supporting web structure separating the at least two channels. In some embodiments, the fluid sample adapter can be configured so that the volume of each of the at least two channels, does not substantially differ, while in other embodiments, the channels are configured to have substantially different volumes.

In some embodiments, the one or more fluid channels of the fluid sample adapter include a chamber configured for initial sample preparation steps, such as initial filtering of debris from the fluid sample, initial mixing with reagents, and/or initial fragmentation of the DNA of the target analyte, such as a sonication chamber or sharp edges adapted for adapted for breaking or fragmenting cells or DNA strands. In some embodiments, the one or more fluid channels include one or more regions that can be adapted for providing controlled flow of the fluid sample, such as may be used for transitive storage or collection of the fluid sample. Such regions can also be used for example in mixing, pre-amplification, or to facilitate preparation or analysis of the fluid sample.

In some embodiments, the fluid sample adapter includes fluid-tight couplings, each defined as a stub dimensioned to be fittingly received within one or more corresponding ports in the sample cartridge. The stubs can be dimensioned to be fluidly coupled by a friction fit within the corresponding ports in the sample cartridge or a cartridge housing that is inserted into the sample cartridge. In some embodiments, the fluid sample adapter includes a pair of fluid channels fed by two inlet stubs that are fittingly received along a portion of the cartridge housing having two fluid transfer ports. In some embodiments, the fluid tight couplings can include a leur-lock connection, a friction fit connection, a screw type connection, a click-fit connection, and the like.

In some embodiments, the fluid sample adapter includes a flange from which the inlet stubs extend, the flange being engageable with a retaining member of the sample cartridge so as to maintain the fluid tight coupling and position of the chip carrier device when coupled to the sample cartridge. The sample cartridge can also include a gasket surrounding the plurality of fluid transfer ports, the gasket being of a formable material, such as an elastomeric material, so that when the inlet portions of the first end of the chip carrier device are fluidly coupled with the at least two fluid transfer ports, the gasket member engages a proximal facing surface of the flange so as to ensure a fluid-tight coupling.

In some embodiments, the chip carrier device can include one or more features for further processing of the fluid sample during transport through the chip carrier device. In some embodiments, the chip carrier device can include at least one processing region in fluid communication with at least one of the fluid channels, wherein the processing region is not a sample preparation chamber. In some embodiments, the chip carrier device includes a pre-amplification chamber and/or an amplification chamber for carrying out a polymerase chain reaction or other suitable nucleic acid amplification test (NAAT). In some embodiments, the chip carrier device includes a flowcell adapted to interface with an active area of the semiconductor chip carried within the chip carrier device. In one aspect, the flowcell adapter facilitates direct contact of the fluid sample with the active area of the chip. In some embodiments, at least a portion of the chip carrier device is at least partly translucent or transparent so as to allow confirmation that the fluid sample is passing through the fluid sample adapter by visual observation or optical monitoring. In some embodiments, the fluid sample adapter can include one or more features that may provide an additional process step, for example, a chamber for chemical treatment, such as bisulfite treatment, a pre-amplification chamber or filter, or features that facilitate passage of the fluid sample through the fluid sample adapter, such as a gas permeable vent or a bubble trap.

In some embodiments, the chip carrier device is of sufficient length and dimension that when coupled with a sample cartridge mounted within a cartridge receiver of a sample cartridge processing module having a passageway, the carrier extends to an instrument interface including an array of electrode contacts that connect with corresponding electrode contacts of an electrical interface board of the chip carrier device to facilitate operation of the semiconductor chip through the instrument interface.

In some embodiments, the chip carrier device is defined by one or more components formed of a planar frame supporting and defining one or more fluidic channels. Each of the planar frames can be formed of a sufficiently stiff material, typically a polymer-based material, so as to support the one or more fluidic channels so that the chip carrier device extends laterally from the sample cartridge to interface with the instrument interface. In some embodiments, the one or more planar frames are sufficiently rigid so as to withstand a normal force against the planar frames from the electrical contacts of the instrument interface when engaged against the electrical interface board of the chip carrier device. Typically, the electrical contacts of the instrument interface are pogo pins that resiliently engage the electrical contact pads of the interface of the chip carrier device when the instrument interface board is engaged against the chip carrier device. In some embodiments, the instrument interface board is configured so as to move or pivot toward the chip carrier device so as to securely engage corresponding electrical contacts when a sample cartridge coupled with a chip carrier device is received within the module. In other embodiments, the electrical contacts could be configured as an edge connector. It is appreciated that the electrical contacts could be configured to connect by any suitable means or to accommodate any connection standard or arrangement.

Another aspect of the invention provides for methods of processing and analyzing a sample utilizing a chip carrier device as provided herein. Such methods can include steps of: receiving a sample cartridge at a cartridge receiver of a module, the sample cartridge comprising a plurality of processing chambers fluidically interconnected by a one or more mechanisms; receiving an electronic instruction to process the unprepared sample into a prepared sample from a processing control unit of the cartridge receiver; performing a sample preparation method to process the unprepared sample into the prepared sample; and fluidically moving the prepared sample into a chip carrier device fluidly coupled with the sample cartridge. Such methods can further include performing an analysis of the fluid sample using an active element of a chip supported within the chip carrier device via processing control unit of the cartridge processing module electrically coupled with the chip through an instrument interface of the module.

Another aspect of the invention provides for methods of transporting a fluid sample between a sample processing device, such as the sample cartridge, and a semiconductor chip as provided herein. A non-limiting exemplary method includes fluidly coupling a sample processing device with a semiconductor chip via a chip carrier device carrying the semiconductor chip, the chip carrier device being fluidically coupled with the sample cartridge via one or more fluid ports. In some embodiments, the chip carrier device is configured to utilize one or more fluid ports on a sample processing device (e.g., a sample cartridge) to allow for sample processing in a sample processing device (e.g., sample preparation) before transport of the processed fluid sample into the chip carrier device via the one or more fluid ports for subsequent processing (e.g., analysis) with a semiconductor chip of the carrier. In some embodiments, the method further includes controlling the semiconductor chip with an instrument interface of the module in which the sample cartridge is received. In some embodiments, the method further includes controlling the chip in the carrier with a control module that is separate from the module, for example, part of an add-on module that interfaces with the semiconductor chip from outside the module or through an access passageway of the module. In some embodiments, fluid flow through the one or more channels can be effected through pressurization/depressurization or by displacement of the fluid sample by the sample processing devices. Typically, an instruction for transport of the fluid sample from the cartridge into the chip carrier device is provided by a control unit of the module that receives the sample cartridge and controls sample preparation therein. It is appreciated that various alternative configurations may be used in providing motive force for transfer of the fluid sample through the chip carrier device with the module through the fluid sample cartridge.

In some embodiments, methods for processing an unprepared sample can include steps of: receiving a sample cartridge in a cartridge receiver of a module, the sample cartridge including a biological fluid sample to be analyzed, a plurality of processing chambers fluidically interconnected by a moveable valve body; receiving an electronic instruction to process the biological sample into a prepared sample from the module; performing a sample preparation method in the sample cartridge to process the biological fluid sample into the prepared sample; transporting the prepared sample into a chip carrier device fluidically coupled with the sample cartridge; and performing analysis of the biological fluid sample with a chip carried within the chip carrier device. In some embodiments, transporting the sample may include steps of: moving a cartridge interface unit to move the valve body to change fluidic interconnections between the plurality of sample processing chambers; applying pressure to a pressure interface unit to move fluid between the plurality of processing chambers according to position of the valve body; and fluidically moving the prepared sample into the chip carrier device. Performing analysis of the fluid sample can include controlling operation of the chip with the module via an instrument interface board electrically coupled with an electrical interface board of the chip carrier device. Any result of the analysis can be obtained by the module via the electrical interface and communicated to various other devices as desired.

DETAILED DESCRIPTION OF THE INVENTION

Figure 1:
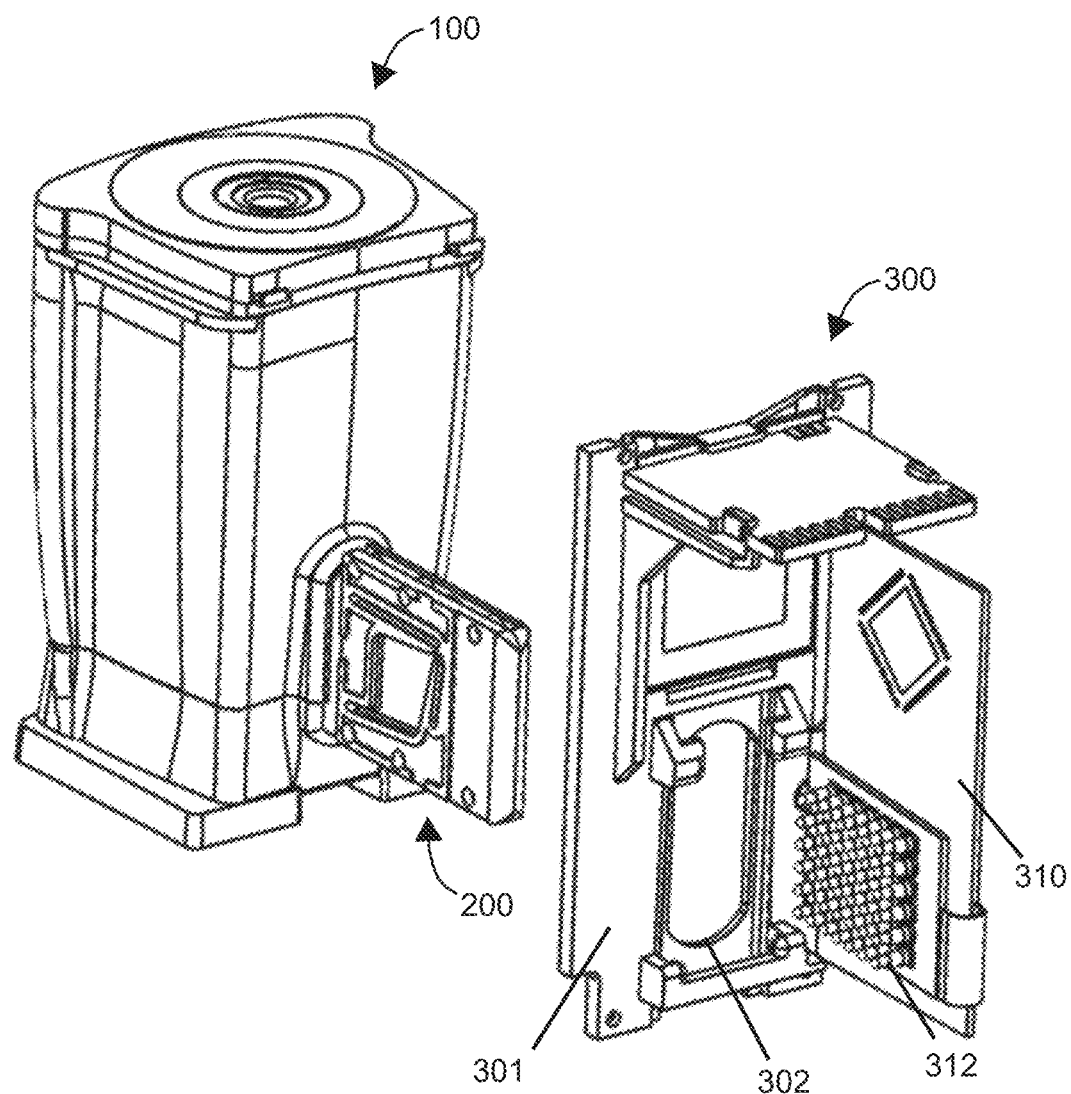
FIG. 1 is an overview of a sample cartridge fluidically coupled with a chip carrier device and an associated instrument interface board of a module for receiving and operating the sample cartridge in accordance with some embodiments of the invention.

The present invention relates generally to a system, device and methods for fluid sample manipulation and analysis, in particular, for transport of a fluid sample from a sample processing device into a chip carrier device for analysis using a semiconductor chip.

I. Exemplary System Overview

In one aspect, the invention relates to a chip carrier device having one or more fluid conduits that are fluidly coupleable with one or more ports of a sample cartridge to facilitate transport of a processed fluid sample from the cartridge into the chip carrier device through the one or more fluid conduits for further processing with a semiconductor chip in the chip carrier device. In some embodiments, the sample cartridge is received by a module which facilitates operation of the sample cartridge to perform processing and transport of the processed fluid sample into the chip carrier device and further includes an instrument interface that electrically connects to the chip carrier device to facilitate operation of the semiconductor chip carried within the device.

In some embodiments, the chip carrier device can include a variety of features, such as one or more specific regions, each region adapted for a sample processing procedure or a sample analysis procedure. Non-limiting exemplary sample processing procedures can include, filtration, concentration, incubation, mechanical, electrical, optical, chemical treatment and/or amplification. In some embodiments, the chip carrier device includes a pre-amplification region for conducting a polymerase chain reaction or other type of nucleic acid amplification procedure as known to persons of skill in the art. Additional sample processing procedures suitable for use with the invention are well known to persons of skill in the art. Non-limiting exemplary sample analysis procedures can include, amplification, hybridization, optical interrogation, iso-electric focusing, antibody binding and detection (e.g. ELISA), sequencing, chromatography, and lateral flow chromatography. Additional sample analysis procedures suitable for use with the invention are well known to persons of skill in the art. The chip carrier device can further include one or more features, including filters, traps, membranes, ports and windows, to allow additional processing steps during transport of the fluid sample to the semiconductor chip.

A. Sample Cartridge Device

The sample cartridge device can be any device configured to perform one or more process steps relating to preparation and/or analysis of a biological fluid sample according to any of the methods described herein. In some embodiments, the sample cartridge device is configured to perform at least sample preparation. The sample cartridge can further be configured to perform additional processes, such as detection of a target nucleic acid in a nucleic acid amplification test (NAAT), e.g., Polymerase Chain Reaction (PCR) assay, by use of a reaction tube attached to the sample cartridge. Preparation of a fluid sample generally involves a series of processing steps, which can include chemical, electrical, mechanical, thermal, optical or acoustical processing steps according to a specific protocol. Such steps can be used to perform various sample preparation functions, such as cell capture, cell lysis, binding of analyte, and binding of unwanted material.

Figure 18:
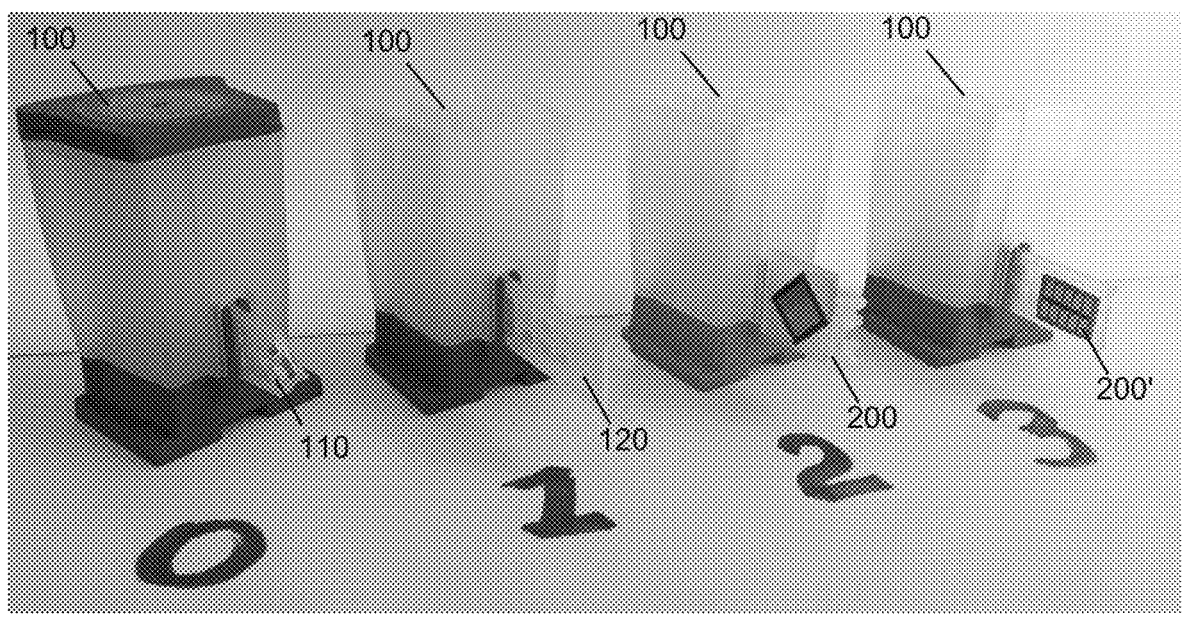
FIG. 18 illustrates alternative embodiments employing different detection modes, each configured for use with a sample cartridge, in accordance with some embodiments.

A sample cartridge suitable for use with the invention, includes one or more transfer ports through which the prepared fluid sample can be transported into a reaction tube for analysis. FIG. 1 illustrates an exemplary sample cartridge 100 suitable for use with a chip carrier device in accordance with some embodiments. Conventionally, such a sample cartridge is associated with a reaction tube 110 (see embodiment 0 in FIG. 18) adapted for analysis of a fluid sample processed within the sample cartridge 100. Such a sample cartridge 100 includes various components including a main housing having one or more chambers for processing of the fluid sample, which typically include sample preparation before analysis. In accordance with its conventional use, after the sample cartridge 100 and reaction tube 110 are assembled (as shown in FIG. 18), a biological fluid sample is deposited within a chamber of the sample cartridge and the cartridge is inserted into a cartridge processing module configured for sample preparation and analysis. The cartridge processing module then facilitates the processing steps needed to perform sample preparation and the prepared sample is transported through one of a pair of transfer ports into fluid conduit of the reaction tube 110 attached to the housing of the sample cartridge 100. The prepared biological fluid sample is then transported into a chamber of the reaction tube 110 where the biological fluid sample can undergo nucleic acid amplification. In some embodiments, the amplification is a polymerase chain reaction. In some embodiments, concurrent with the amplification of the biological fluid sample, an excitation means and an optical detection means of the module is used to detect optical emissions that indicate the presence or absence of a target nucleic acid analyte of interest, e.g., a bacteria, a virus, a pathogen, a toxin, or other target analyte. It is appreciated that such a reaction tube could include various differing chambers, conduits, or micro-well arrays for use in detecting the target analyte. The sample cartridge can be provided with means to perform preparation of the biological fluid sample before transport into the chip carrier device. Any chemical reagent required for viral or cell lysis, or means for binding an analyte of interest (e.g. reagent beads) can be contained within one or more chambers of the sample cartridge, and as such can be used for sample preparation.

An exemplary use of a reaction tube for analyzing a biological fluid sample is described in commonly assigned U.S. Pat. No. 6,818,185, entitled "Cartridge for Conducting a Chemical Reaction," filed May 30, 2000, the entire contents of which are incorporated herein by reference for all purposes. Examples of the sample cartridge and associated module are shown and described in U.S. Pat. No. 6,374,684, entitled "Fluid Control and Processing System" filed Aug. 25, 2000, and U.S. Pat. No. 8,048,386, entitled "Fluid Processing and Control," filed Feb. 25, 2002, the entire contents of which are included as an appendix, and are incorporated herein by reference in their entirety for all purposes.

Various aspects of the sample cartridge 100 shown in FIGS. 3-17 can be further understood by referring to U.S. Pat. No. 6,374,684, which described certain aspects of a sample cartridge in greater detail. Such sample cartridges can include a fluid control mechanism, such as a rotary fluid control valve, that is connected to the chambers of the sample cartridge. Rotation of the rotary fluid control valve permits fluidic communication between chambers and the valve so as to control flow of a biological fluid sample deposited in the cartridge into different chambers in which various reagents can be provided according to a particular protocol as needed to prepare the biological fluid sample for analysis. To operate the rotary valve, the cartridge processing module comprises a motor such as a stepper motor that is typically coupled to a drive train that engages with a feature of the valve in the sample cartridge to control movement of the valve and resulting movement of the fluid sample according to the desired sample preparation protocol. The fluid metering and distribution function of the rotary valve according to a particular sample preparation protocol is demonstrated in U.S. Pat. No. 6,374,684, which is incorporated herein for all purposes.

It is appreciated that the sample processing cartridge described above is but one example of a sample processing device suitable for use with a chip carrier device in accordance with embodiments as described herein. While chip carrier configurations that allow for use of such a sample processing cartridge are particularly advantageous as they allow utilization of conventional fluid sample cartridges, it is appreciated that the concepts described herein are applicable to various other sample processing devices, which can include various other sample cartridge configurations or other fluid sample processing devices and components.

B. Chip Carrier Device

The chip carrier device is adapted to fluidically couple a semiconductor chip to a sample cartridge as described herein. In some embodiments, the chip carrier device includes an electrical interface adapted to interface with an instrument interface board of a sample processing module which operates the sample processing cartridge. It is appreciated that the chip carrier device can be configured for use with any type of chip, including but not limited to CMOS, ISFET, bulk acoustic, non-bulk acoustic, piezo-acoustic, and pore array sensor chips. Further, the chip can be adapted for use in an open package to any of the many JDEC standards, including but not limited to QFN, dual in-line, and BGA array. Alternatively, the chip can be mounted directly to the PCB as a chip-on-board assembly. In some embodiments, the chip carrier device is designed to allow analysis of the biological fluid sample with the chip by electrical operation of the chip by the instrument interface of the module. This is accomplished through electrical contact pads of the chip carrier device that are electrically connected to the chip and which interface with the instrument interface of the module.

A configuration as described above allows for a more seamless transition between processing of the fluid sample with the sample cartridge and subsequent processing or analysis of the fluid sample with the chip in the chip carrier device. This configuration facilitates industry development of semiconductor chip devices by standardizing processing or preparation of the sample and delivery of the processed sample to the chip device. Preparation of the sample can be a time consuming and laborious process to perform by hand and can be challenging to develop within a next generation chip device. By utilizing a chip carrier device instead of the reaction tube, the user can utilize the sample cartridge to prepare the sample in a sample cartridge and subsequently transport the prepared sample into the attached chip carrier device for analysis with the semiconductor chip carried therein. Such a configuration expedites development of semiconductor chip by utilizing existing sample preparation processes, configured for PCR detection, and allowing use of such processes with a semiconductor chip device.

In some embodiments, the chip carrier device can include one or more processing features in fluid communication with one or more of the fluid flow channels, such as one or more chambers, filters, traps, membranes, ports and windows, to allow additional processing steps during transport of the fluid sample to the second sample processing device. Such chambers can be configured for use with an amplification chamber to perform nucleic acid amplification, filtration, chromatography, hybridization, incubation, chemical treatment, e.g., bisulfite treatment and the like. In some embodiments, the chamber allows for accumulation of a substantial portion of the fluid sample, if not the entire fluid sample, for further processing or analysis as needed for a particular protocol. In some embodiments, the chamber comprises a window that is at least partly transparent, which allows for optical detection of an analyte of interest in the fluid sample through the chamber during transport of the fluid sample through the chip carrier device. This feature is particularly advantageous when screening for the presence or absence of multiple analytes, or for an analysis that may require several or redundant detection steps or require further processing and/or analysis of the fluid sample after detection of a particular target or analyte of interest.

C. Instrument Interface

The instrument interface of the module is a circuit board adapted to engage an electrical interface of the chip carrier device to allow the module to electrically control the semiconductor chip. In some embodiments, the instrument interface is located within a common housing of the module to provide more seamless processing between the fluid sample cartridge and the chip carrier device. The instrument interface can be controlled by the module in coordination with transport of the fluid sample from the sample cartridge to the semiconductor chip.

In some embodiments, instrument interface board is mechanically mounted on a pivot that moves toward the chip carrier device when received within the module. The instrument interface board is configured to pivot from an open position before the sample cartridge is loaded to an engaged position when loaded. A cam (not shown) positions the interface board into contact with the electrical interface board on the chip carrier device. Pogo pins on the instrument interface board contact the electrical contact pads on the electrical interface board to allow the module to control analysis of the fluid sample with the chip carried within the chip carrier device.

In some embodiments, the chip carrier device is configured with fluid flow channels of similar flow dimensions as the fluid channels with the reaction tube 110 noted above (see U.S. Pat. No. 6,374,684). This allows the same mechanisms by which fluid sample is transported through the reaction tube to be used to transport fluid sample into the chip carrier device. A person of skill in the art would appreciate that transport of the fluid sample into the chip carrier device can be effected in any number of ways in accordance with various other aspects of the invention described herein.

II. Example Chip Carrier Devices and Associated Systems

A. System Overview

FIG. 1 illustrates an overview of a system utilizing a conventional fluid sample cartridge 100 fluidically coupled with a chip carrier device 200. The fluid sample cartridge 100 is adapted for insertion into a bay of a processing module configured to perform one or more processing steps on a fluid sample contained within the fluid sample cartridge through manipulation of the fluid sample cartridge. An instrument interface 300 of the module is incorporated into the module within the bay in which cartridge 100 is received and includes a plate 301 having a receptacle opening 302 through which the chip carrier device 200 extends when cartridge 100 is positioned within the bay. The instrument interface 300 further includes an instrument board 310, such as a PCB board, that extends alongside a major planar surface of chip carrier device 200 and includes electrical contacts 312 arranged so as to electrically couple with corresponding contact pads on the major planar surface of the chip carrier device.

Figure 2A:
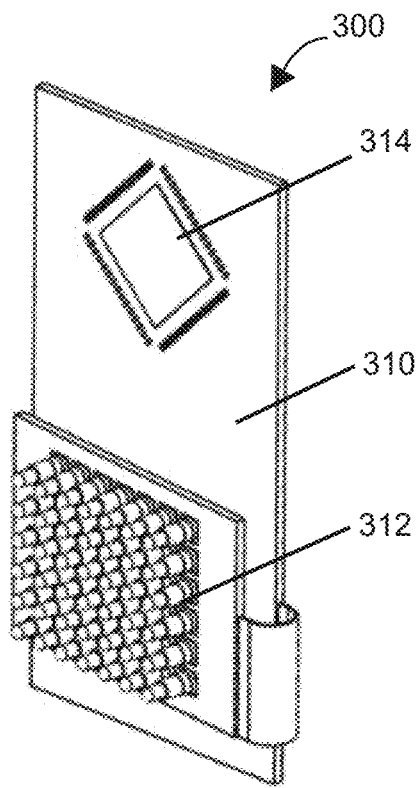
FIG. 2A illustrates the instrument interface board of the module, the instrument interface board having an array of electrical contacts for interfacing with electrical contact pads of the chip carrier device when the sample cartridge is received within the module, as shown in FIG. 2B, in accordance with some embodiments.
Figure 2B:
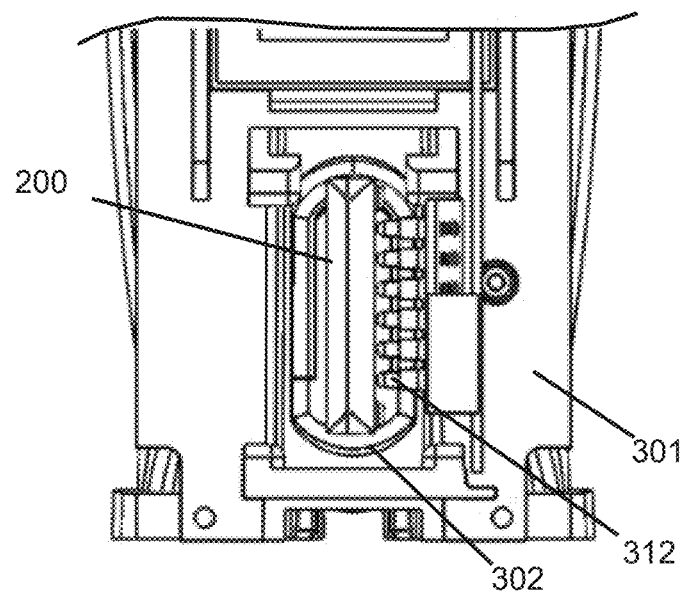

FIG. 2A illustrates the instrument interface board 310 of the module and the electrical contacts 312 for interfacing with electrical contact pads of the chip carrier device. Typically, the contacts 312 are arranged in a pattern, such as a rectangular array, that corresponds to the contacts of the chip carrier device. In one aspect, the electrical contacts are configured to facilitate on-board electrical connections. In this embodiment, the contacts 312 are configured as pogo-pins so as to deflect upon insertion of the chip carrier device 200 through receptacle opening 302 to provide secure electrical coupling between contacts 312 and corresponding contacts on chip carrier 230 of the chip carrier device 200, as shown in FIG. 2B. Although a rectangular array of pogo-pins is depicted here, it is appreciated that the electrical contacts could be arranged in various other patterns, in accordance with a corresponding chip carrier device and that various other contact constructions could be realized. In some embodiments, the electrical contacts could be configured as one or more edge connectors or other types of multi-pin connector arrangements. It is further appreciated that the instrument interface need not utilize every contact so as to be compatible for use with a carrier having differing numbers or arrangements of contact pads, as desired. In some embodiments, the electrical contacts could include an additional adapter so as to be suitable for use with various differing types of chip carrier devices. In some embodiments, it may be cost effective to package a semiconductor controller as an adjunct to the chip carrier such that the signal connectivity is minimized. Such an approach could use any suitable connector means, which can include a standard connector type, such as a USB interface (e.g. [+1, −2, sig 3, sig 4]).

A. Fluid Sample Adapter

Figure 3:
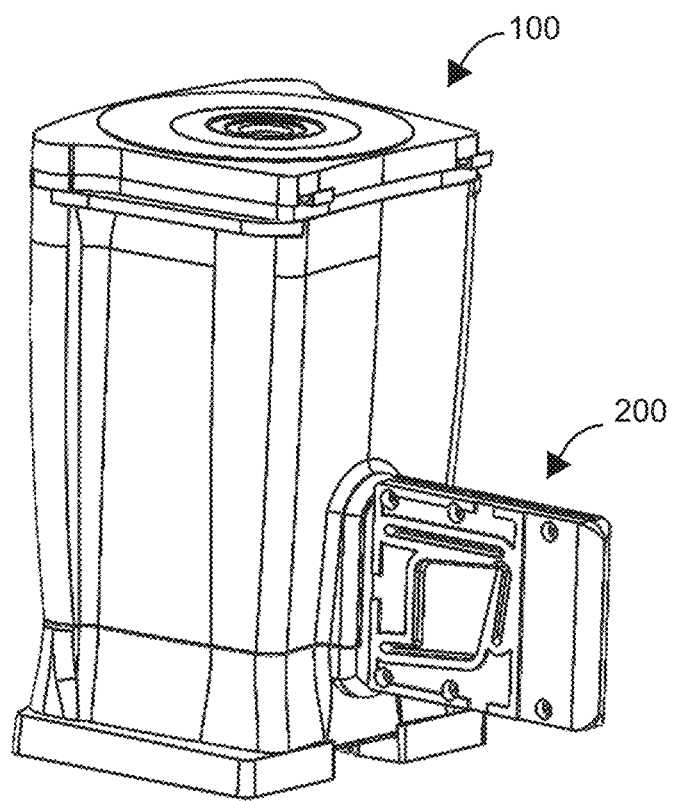
FIG. 3 illustrates a detailed view of the sample cartridge fluidically coupled with a chip carrier device, in accordance with some embodiments.
Figures 4A, 4B:
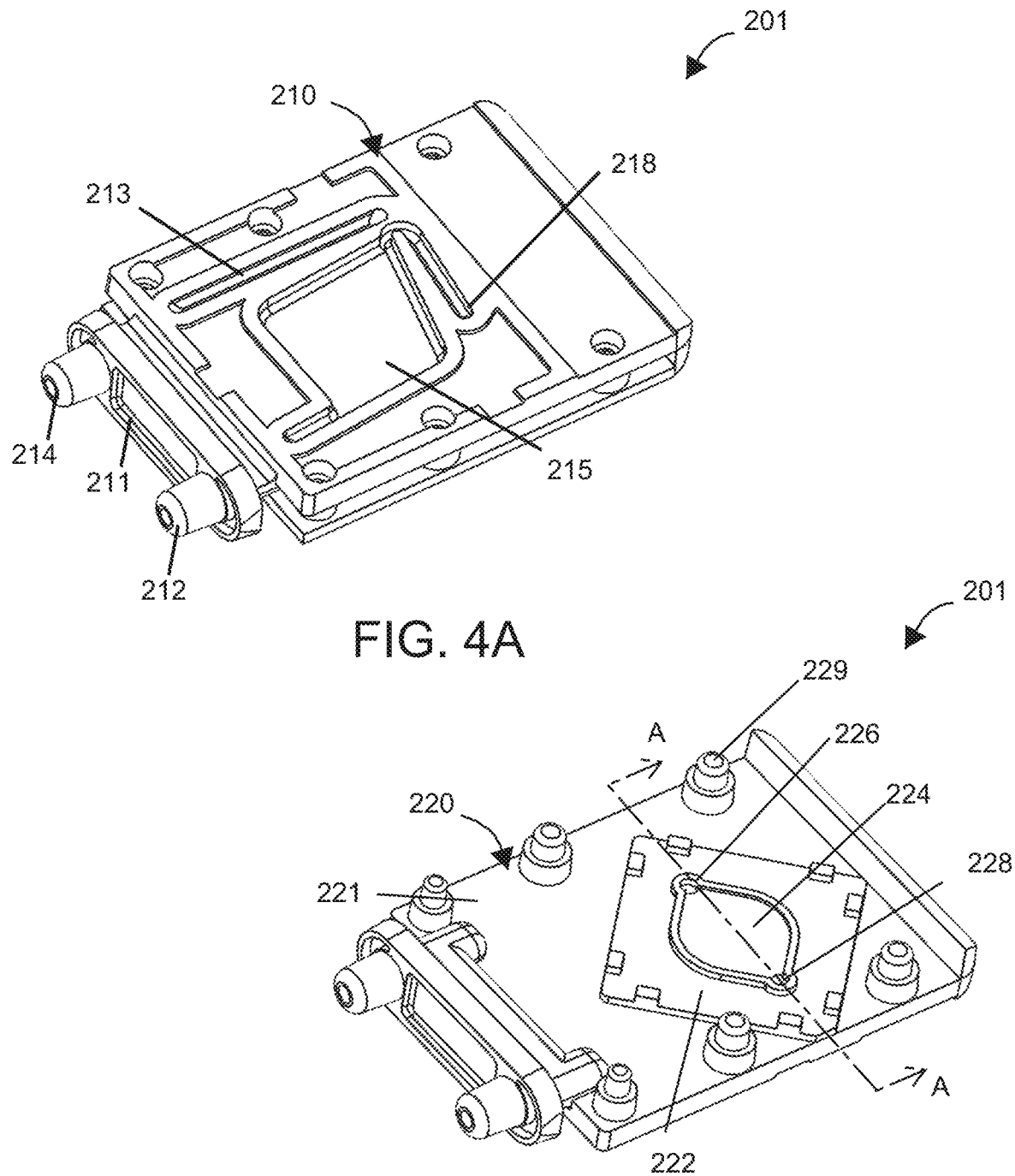
FIGS. 4A-4C illustrate various views of a fluid sample adapter component of the chip carrier device, in accordance with some embodiments.

FIG. 3 illustrates a detailed view of the sample cartridge 100 fluidically coupled with chip carrier device 200, in accordance with some embodiments. In this embodiment, the chip carrier device 200 includes a fluid sample adapter 201 having a fluid flow portion on one side and a flowcell portion on the opposing side. As can be understood further by referring to FIGS. 4A-4B, the fluid sample adapter 201 fluidically couples to the sample cartridge 100 by a fluidic interface 211 having a pair of fluid ports 212, 214 that couple with corresponding fluid ports of the sample cartridge. On one side, the fluid sample adapter 201 includes a fluid flow portion 210 defined therein, as shown in FIG. 4A, while on the opposing side, the fluid sample adapter has a flowcell portion 220 defined therein, as shown in FIG. 4B. The flowcell portion 220 is fluidically coupled with the fluid flow portion 210 such that fluid introduced through a fluid inlet of the fluidic interface 211 flows through the fluid flow portion 210 before flowing into a flowcell 224 defined in the flowcell portion 220. The flowcell portion 220 is configured to couple with a chip carrier portion 230 such that a chip carried within the chip carrier portion 230 engages against the flowcell chamber 224. The flowcell portion 220 can include one or more coupling features 229 (e.g. six protruding knobs about the perimeter of a major face) to facilitate alignment and secure coupling of the chip carrier portion 230 with the fluid sample adapter 201. Any or all of the adapter or flow cell portion of the chip carrier device are formed from a suitably rigid material such that the chip carrier device 200 extends outward from the sample cartridge 100. In some embodiments, the chip carrier device 200 is supported only by a pair of inlet stubs of the fluidic interface of the fluid sample adapter 201 fittingly received within the corresponding pair of fluid ports of sample cartridge 100 and a surrounding flange.

B. Fluid Flow Portion

Figure 4C:
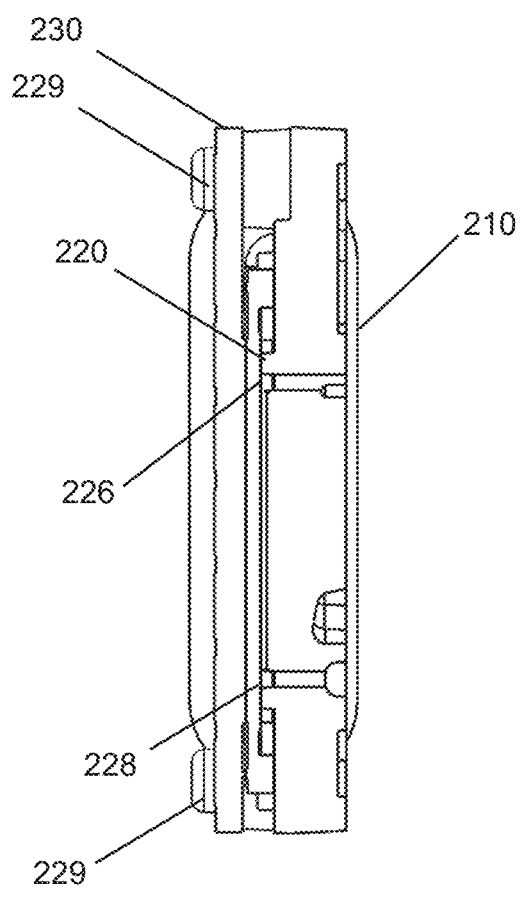

FIGS. 4A-4C depict an exemplary fluid sample adapter device in accordance with some embodiments. As shown in FIG. 4A, the fluid sample adapter portion 210 includes two fluid channels or conduits spaced apart and extending within the chip carrier device. The channels are separated and supported by a supporting web structure. The chip carrier device can be fabricated from any material suitable for transport of a fluid sample selected so as to not interfere with processing or analysis of the sample, typically an inert plastic or polymer-based material can be used. In some embodiments, the components of the chip carrier are formed of polycarbonate, polysulfone, or any suitable material (e.g. any material compatible with an adhesive). In some embodiments, the material is compatible with a silicone adhesive. In some embodiments, the material used to fabricate the chip carrier device is a transparent or partly translucent material to allow visual observation of sample transport and/or optical detection/monitoring of the fluidic channel through the material.

In some embodiments, the chip carrier device includes a fluid sample adapter configured with the same Luer ports and flange arrangement of the fluidic interface as a typical PCR reaction tube so that the fluid sample adapter can easily interface with sample cartridges. The fluid sample adapter is configured such that the ports connect fluidically to an optional PCR pre-amplification chamber. Alternatively, the amplification chamber could house a filter, an affinity matrix, a magnetic capture zone, or other active area that can be manipulated by the module. Typically, the fluidic pathways are defined in a first substrate and sealed by a second substrate, such as a thin film, similar to the construction of conventional PCR reaction tubes. In some embodiments, the fluid sample adapter also features alignment and assembly bosses as well as mechanical snaps so that a chip carrier component or chip can be secured against a flowcell of the flowcell portion with ease.

In some embodiments, the length of the fluid sample adapter is about 12 cm, 11 cm, 10 cm, 9 cm, 8 cm, 7 cm, 6 cm, 5 cm, 4 cm, 3 cm, 2 cm, or 1 cm in length. In some embodiments, the fluid sample adapter 210 has a length between 3 to 5 cm, such as about 4 cm from the flange of the fluidic interface 211, and the fluid channels extend in parallel and are separated by about 1 cm. This configuration allows for substantially fluid-tight couplings that are of substantially the same construction as a conventional reaction tube. The fluid-tight couplings of each channel are defined by a stub, each stub being dimensioned to be fittingly received in a corresponding external port of the sample cartridge to facilitate a fluid-tight coupling of the fluid channels with corresponding fluid channels of the chip carrier device. For example, stubs along fluid inlets and outlet 212, 214 at the fluidic interface 211 at the proximal end of the chip carrier device 200 serve as inlet stubs for flow of the prepared fluid sample into through the fluidic path of the fluid flow portion 210. In some embodiments, these stubs can have an outside diameter between 2-10 mm, for example, the outside diameter can be 2, 3, 4, 5, 6, 7, 8, 9, or 10 mm. Typically, the outside diameter of the stub is about 3 mm, and extends from the flange a distance of about 2-5 mm, such as about 3 mm, to facilitate fluid-tight coupling. In some embodiments, the inside diameter of each of the one or more channels within any of the components of the chip carrier device can be within a range of 1 mm to 5 mm.

In some embodiments, the fluid sample adapter 201 includes one or more channels that extend between fluid-tight couplings without any chambers, valves or ports between the proximal and distal ends. In some embodiments, the fluid sample adapter 201 includes one or more valves, or ports. In some embodiments, the one or more channels can include one or more chambers or regions, which can be used to process or analyze the fluidic sample. For example, the fluid sample adapter can include one or more chambers or regions for thermal amplification of a nucleic acid target in the sample, filtration of the sample, chromatographic separation of the sample, hybridization, and/or incubation of the sample with one or more assay reagents.

While the fluid tight couplings shown in FIG. 4A includes stubs extending from a flange of the fluidic interface 210, it is appreciated that various other fluid-tight couplings suitable for use with the invention can be devised as needed to fluidly couple with other types of devices. Non-limiting exemplary fluid type couplings suitable for use with the invention, include, Luer-lock connections, snap-fit connections, friction fittings, click-fit connections, and screw-on connections. Additional types of fluid tight couplings suitable for use with the invention are well known to persons of skill in the art.

As can be seen in FIGS. 4A-4C, the fluid sample adapter 201 is defined by one or more planar substrates defining a fluidic path 213 coupled to a fluidic interface 211. The fluidic interface 211 is a structural member from which a majority of the planar frame cantilevers when the fluidic interface 211 is coupled with the sample cartridge. The fluidic interface 211 can be integrally formed with the planar frame. The fluidic interface 211 also serves as a mechanical coupling to sample cartridge 100. Fluidic interface 211 includes a fluidic inlet 212 and fluidic outlet 214, which provides a fluidic interface to the sample cartridge device. Each of the fluidic inlet 212 and fluidic outlet 214 are fluidically coupled to fluidic path 213 that is formed in the planar substrate. It is appreciated that the fluid sample adapter 210 and the fluidic interface 211 can be integrally formed as a single component.

In some embodiments, the fluidic path 213 is defined primarily along one major face of the planar substrate and enclose by a second planar substrate, for example, a thin film heat sealed on the substrate so as to enclose the channels and chambers defined within the substrate. The fluidic path 213 leads to a flowcell interface that extends width-wise through the fluid sample adapter 201 into a set of flowcell ports 226, 228 of a flowcell 224 defined in the flowcell adapter portion 220 defined on the opposite side of the fluid sample adapter 201. In this embodiment, the flowcell interface includes an inlet flowcell port 228 and outlet flowcell port 226, which allow for controlled fluid transport through the fluid sample adapter 201 into the flowcell chamber 224 via the fluidic inlet 212 and fluidic outlet 214. Typically, the flowcell inlet 228 is disposed below the flowcell outlet 226 when the fluid sample adapter 201 is oriented vertically to facilitate controlled fluid flow through the flowcell chamber 224. In this embodiment, the fluidic channels are defined along one major face of the fluid sample adapter 201 and the flowcell portion is defined within the opposing major face. In this embodiment, these portions are formed as an integrally formed component. It is appreciated, however, that the fluidic sample adapter can be formed from one or more components.

It should be understood that use of the terms "inlet" and "outlet" do not limit function of any fluid inlets or outlets described herein. Fluid can be introduced and evacuated from both or either. In some embodiments, the fluidic path 213 is valveless, and thus external increases or decreases in pressures can be applied via the fluidic inlet 212 and fluidic outlet 214 by an external system to move fluid within the fluidic path 213, which extends from the fluidic inlet 212 to the fluidic outlet 214. The cross-section of the fluidic path 213 can be round or rectangular, and can have diameters or widths ranging from about 50 μm to about 2 mm. Typically, the diameters or widths range from about 250 μm to about 1 mm. In this embodiment, the fluidic path 213 includes a chamber 215, which is an enlarged portion of fluidic path 213 between the flowcell 224 and the fluidic inlet 212, the chamber being dimensioned to contain a substantial portion or an entirety of a fluid sample transported from the sample cartridge to facilitate various processes, including but not limited to flow metering, mixing, pre-amplification, thermal cycling, or any other sample processing desired. It is appreciated that various other components could be incorporated into fluid sample adapter, for example, a valve, filter, window, or any other feature desired.

In some embodiments, the chip carrier device (or at least a partial assembly) is provided pre-attached to a sample cartridge with the fluid-tight couplings coupled with corresponding fluid ports of the cartridge. For example, a sample cartridge may be provided already coupled with the fluid sample adapter 201 such that an end-user can insert any chip within a chip carrier 230 component and couple within the flowcell portion 220 to facilitate sample detection with a chip.

C. Flowcell Portion

The flowcell portion of fluid sample adapter 201 is configured with an open chamber that, when interfaced with an active area of a chip within the chip carrier, forms an enclosed flowcell chamber to facilitate analysis of the fluid sample with the chip. The flowcell is shaped and configured to fluidly couple with a chip within a chip carrier attached to the fluid sample adapter 201. Typically, the fluidic pathway of the fluid flow portion fluidically connects to the flowcell chamber through fluid ports 226, 228 located at the top and bottom of the flowcell chamber. The chamber is formed by raised lands or ridges that come in contact with the active silicon or glass element used in the detection scheme. The active element is located on the chip carried within the chip carrier and secured to the flowcell by bonding and sealing, which can be accomplished by various means (e.g. using epoxy preforms, dispensed epoxy or other adhesives, a gasket, a gasket with adhesive, mechanical features, or various other means). The purpose of the flowcell adapter is to create a complete flowcell chamber, bounded by the detection surface on one side and the flowcell adpater on the remaining sides. The flowcell portion 220 also includes one or more coupling features 229 defined as alignment and assembly bosses as well as mechanical snaps that are received in corresponding holes 239 of a chip carrier 230 to align and securely couple the chip carrier 230 with the flowcell portion 220, as shown in the cross-sectional view A-A in FIG. 4C.

FIG. 4B illustrates detailed views of an example flowcell portion 220 for use with the chip device 200. In this embodiment, the flowcell adapter 220 is configured to fluidly communicate with the fluid flow portion 210 shown in FIG. 4A. As shown in FIG. 4B, flowcell portion can be formed within a planar substrate formed of a rigid material (e.g. polymer or any suitable material) so as to define the open flowcell chamber 224, and flowcell ports 226, 228. Flowcell portion 220 is further configured to couple with the chip carrier so as to form an enclosed flowcell chamber with the active area of the chip carried within. The top and bottom flowcell ports 226, 228 fluidly couple the flowcell chamber with fluid channels of the fluid flow portion to allow controlled flow of fluid sample into or out of the flowcell chamber upon controlled pressurization of the inlet and outlet 212, 214 of the chip carrier device 200 fluidly coupled with the sample cartridge 100.

D. Chip Carrier

Figure 5A:
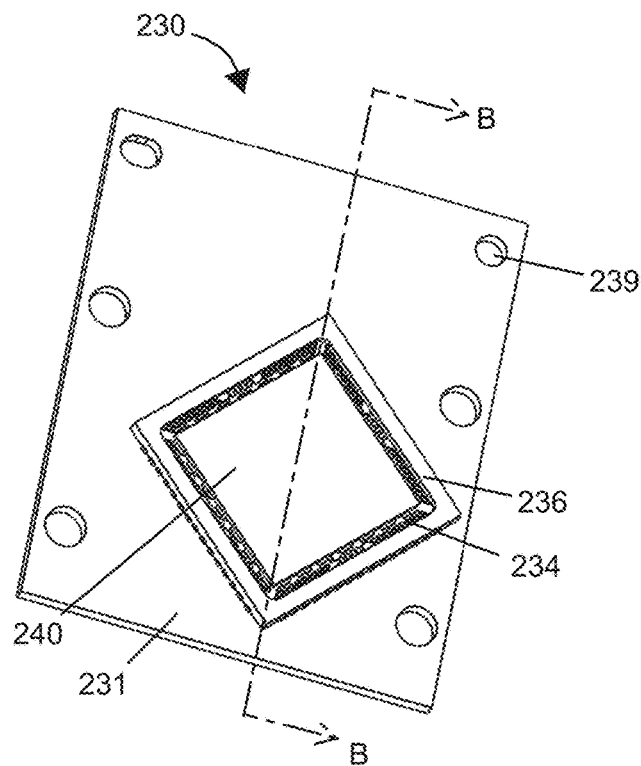
FIGS. 5A-5C illustrate various views of a chip carrier component of the chip carrier device, in accordance with some embodiments.
Figure 5C:
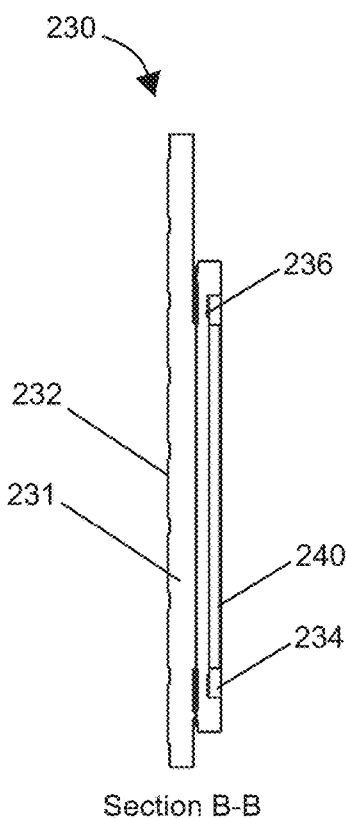
Figure 5B:
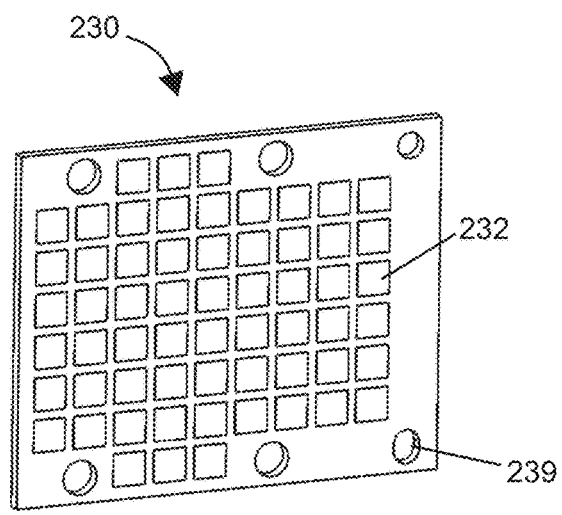

FIGS. 5A-5C illustrate detailed views of a chip carrier 230 of the chip carrier device, in accordance with some embodiments. As can be seen in FIG. 5A, chip carrier 230 is defined within a substantially planar substrate 231 that includes a contoured region 236 dimensioned to receive the chip and configured with multiple electrical contacts 234 arranged to electrically connect with corresponding contacts of the chip when received within. In this embodiment, the contoured region 236 is square and electrical contacts 234 configured to receive and couple with a chip, such as shown in FIG. 5A. Contoured region 236 includes a raised ridge along the perimeter thereof to engage a corresponding portion of the flowcell portion and effectively seal the chip within the chip carrier device. The raised lands or ridge around the open flowcell chamber engage an active surface of the chip so as to form an enclose flowcell chamber, as described above.

The electrical contacts 23 are electrically coupled with corresponding contact array 232 of an electrical interface board disposed on an opposite side of the chip carrier 230, as shown in FIG. 5B. The contact array 232 is defined as an array of enlarged contact pads arranged to facilitate contact with corresponding electrical contacts, typically pogo pins, of the instrument interface 300 of the module. FIG. 5C shows a cross sectional view of chip carrier 230 with a chip carried and electrically coupled within receptacle 236. Wire bonds are not shown in this view. The electrical interface board can also host passive and active electronic components in addition to those of the chip carrier as needed for various other tasks. For example, such components could include any components needed for signal integrity, amplification, multiplexing or other such tasks.

E. Chip

In some embodiments, if the chip 240 includes a silicon sensor element, it can be bonded within the chip carrier 230 and wire bonds applied to connect the silicon element electrically to the chip carrier 230. In other embodiments, the chip can merely be pressed into the recess such that the friction fit provides sufficient electrical contact between corresponding contacts.

In some embodiments, the chip 240 is a semiconductor diagnostic chip. In some embodiments, the semiconductor diagnostic chip is configured to perform sequencing of a nucleic acid target molecule by nanopore sequencing, which detects changes in electrical conductivity and does not require optical excitation or detection. The underlying technologies of such chips can be further understood by referring to U.S. Pat. No. 8,986,928. In some embodiments, the semiconductor diagnostic chip analyzes other attributes of a target molecule in the sample, such as molecular weight and similar characteristics. Such technologies can be further understood by referring to: Xiaoyun Ding, et al. Surface acoustic wave microfluidics. Lab Chip. 2013 Sep. 21; 13(18): 3626-3649. In some embodiments, the semiconductor diagnostic chip uses surface plasmon resonance to provide analysis of a target molecule, for example as used in the Biocore™ systems provided by GE Healthcare UK Limited and as described in their Biocore Sensor System Handbook (see gelifesciences.com/biacore). The entire contents of each of the above references are incorporated herein by reference in their entirety. While semiconductor diagnostic chips are preferred, it is appreciated that the concepts described herein are applicable to any type of chip suitable for use in performing processing or analysis of a fluid sample.

It is appreciated that the chip carrier device can be configured for use with any type of semiconductor chip, including but not limited to CMOS, ISFET, bulk acoustic, non-bulk acoustic chips, piezo-acoustic, and pore array sensor chips. Further, the chip can be adapted for use in an open package to any of the many JDEC standards, including but not limited to QFN, dual in-line, and BGA array. Alternatively, the chip can be mounted directly to the PCB as a chip-on-board assembly.

F. Assembly and Use of Chip Carrier Device

Figure 6A:
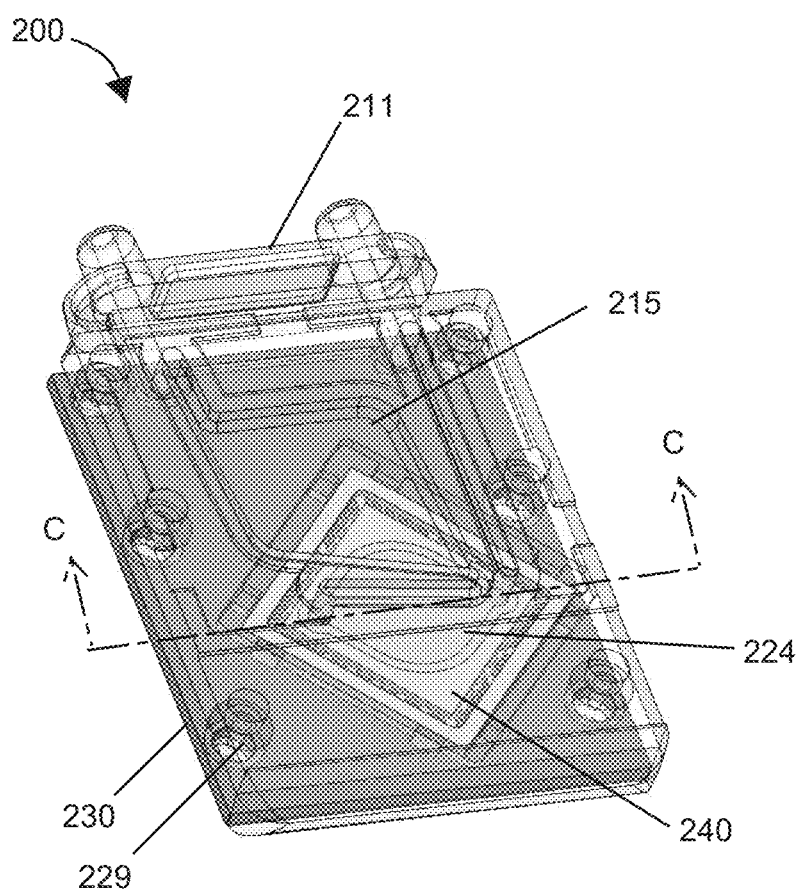
FIGS. 6A and 6B illustrate a detailed view and a cross-sectional view of an assembled chip carrier device, in accordance with some embodiments.
Figure 6B:
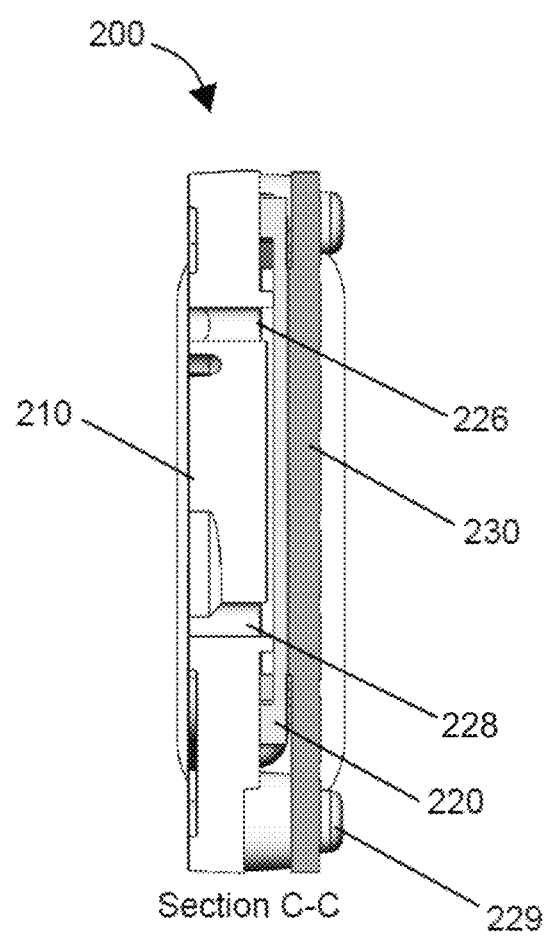

FIGS. 6A and 6B illustrate a perspective view and a cross-section view of a chip carried within an assembled chip carrier device 200, along the same sectional view as shown in the individual component section views. Each of the components of the chip carrier device, the fluid flow portion 210 and flowcell portion 220 of the fluid sample adapter 201 and the chip carrier 230, can be seen interfaced via one or more coupling features such that the fluid channels of the fluid flow portion 210 fluidically coupled with the flowcell portion 220 to facilitate processing or analysis of the fluid sample with the semiconductor chip carried within the chip carrier adjacent the flowcell. The electrical contacts 232 of the chip carrier 230 face outward for engagement with corresponding contacts of the instrument interface 300 to facilitate control of the semiconductor chip with the module, as described above.

Figure 7A:
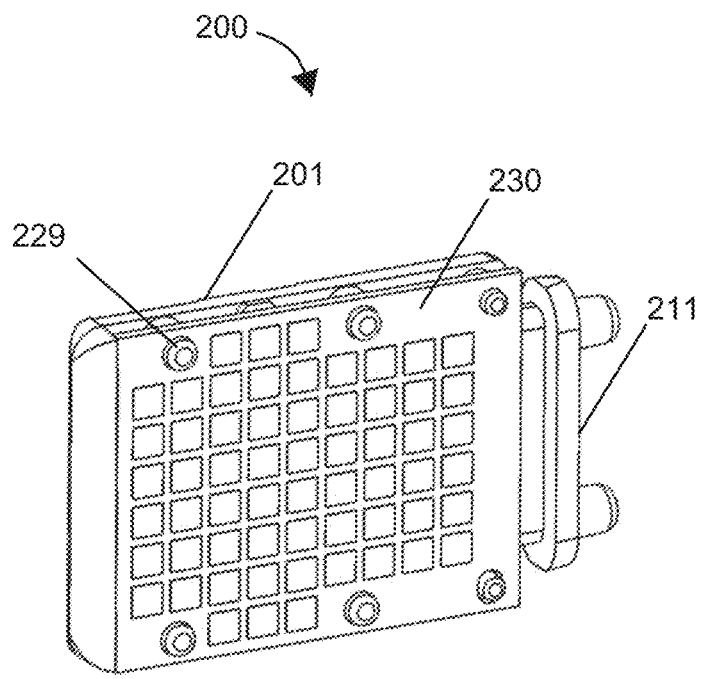
FIGS. 7A and 7B illustrate detailed views of an assembled chip carrier device, in accordance with some embodiments.
Figure 7B:
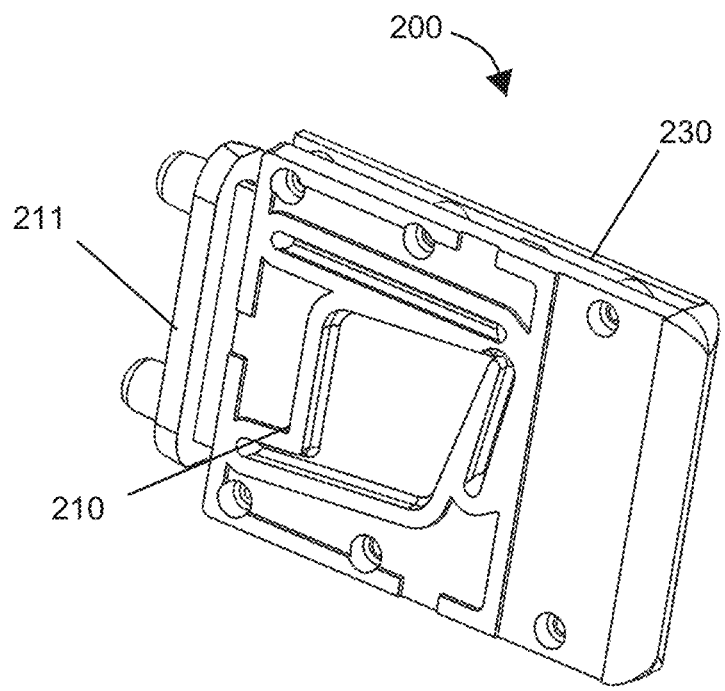

FIGS. 7A-7B illustrates detail views of the assembled chip carrier device 200 before coupling with the sample cartridge 100. While these components of the chip carrier device 200 are coupled and aligned by removable coupling features 229, it is appreciated that such components could be coupled with non-removable coupling feature or permanently bonded, such as by an adhesive or heat sealing. It is further appreciated that the components could be defined to receive the chip in various other ways, for example, the components could be hinged or partly attached along one side. Alternatively, the fluid sample adapter and chip carrier component could be formed as one integral component.

Figure 8:
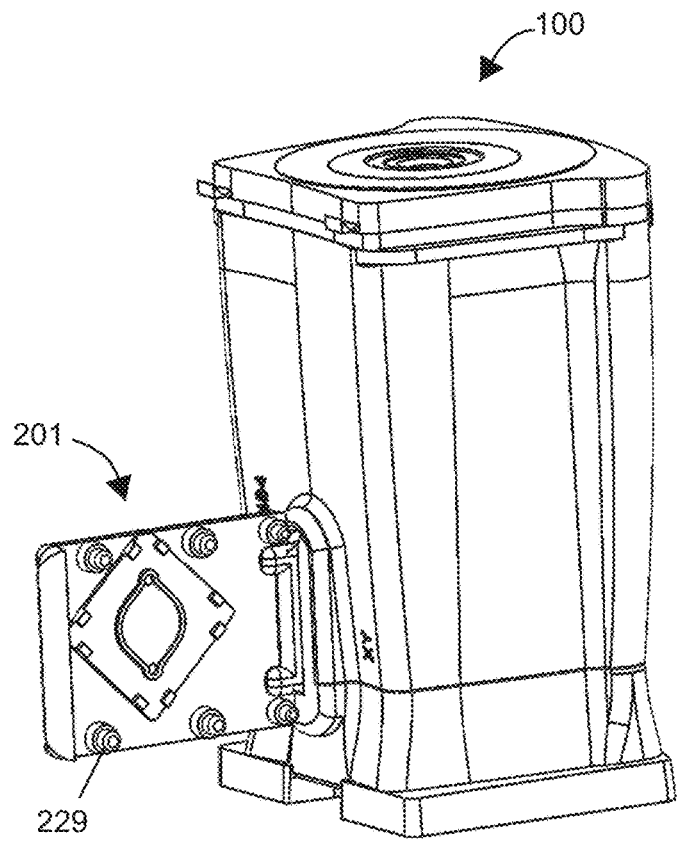
FIGS. 8 and 9 illustrate the fluid sample adapter component and an assembled chip carrier device, respectively, coupled with a sample cartridge, in accordance with some embodiments.
Figure 9:
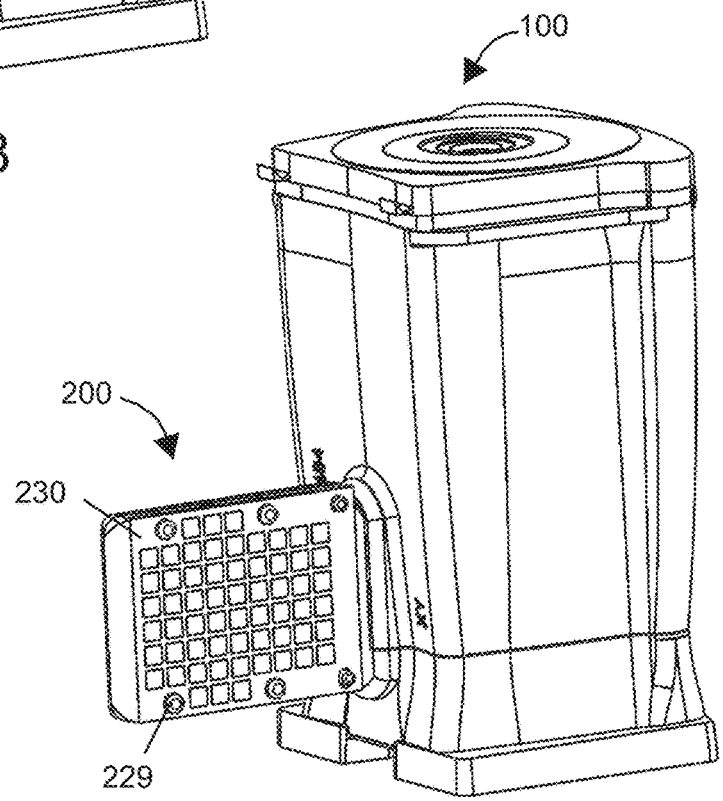

FIG. 8 illustrates a detail view of the sample cartridge 100 coupled with a fluid sample adapter 201 via the fluidic interface 211 (the other components of the chip carrier device have been omitted for improved visibility). FIG. 9 shows the assembled chip carrier device 200 coupled to the sample cartridge 100 via the fluidic interface 211 of the fluidic sample adapter 201. An end-user can assemble the chip carrier device and couple with the sample cartridge in this fashion, before placing the sample cartridge containing a fluid sample within the module for processing and analysis with the chip carried within the chip carrier device 200.

III. Alternative Example Chip Devices and Associated Systems

A. System Overview

Figure 10:
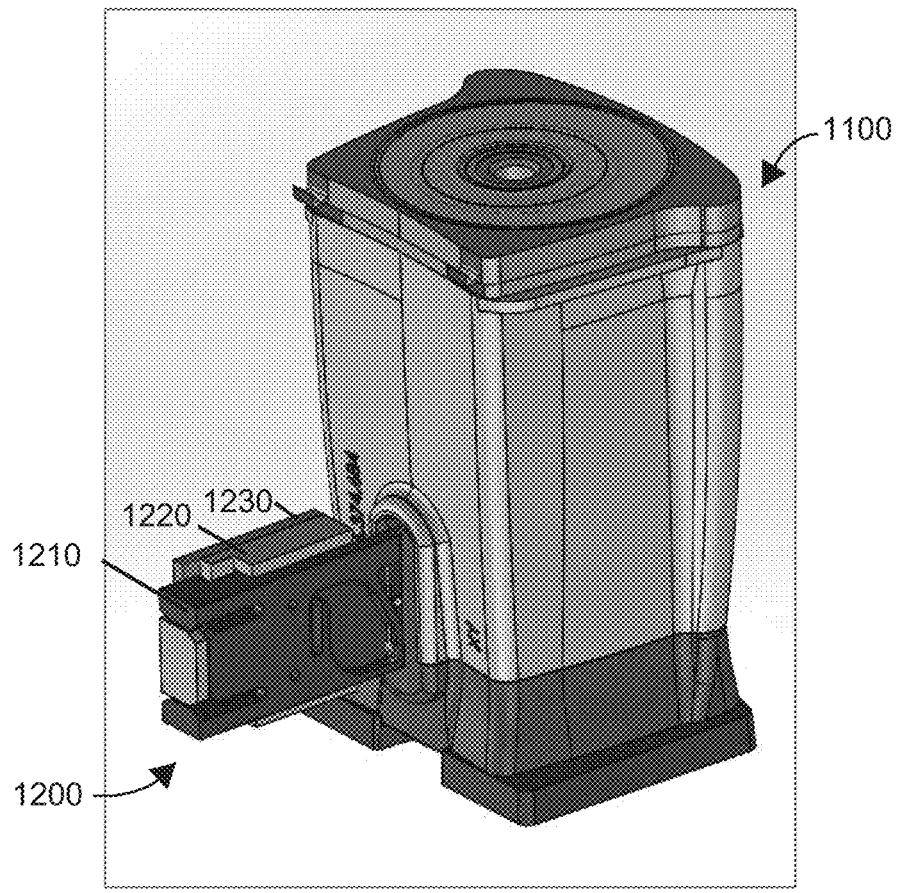
FIG. 10 illustrates an alternative chip carrier device coupled to a sample cartridge, the device including a fluid sample adapter, flowcell adapter and chip carrier component, in accordance with some embodiments.

FIG. 10 illustrates a detail view of the sample cartridge 1100 fluidically coupled with chip carrier device 1200, in accordance with some embodiments. In this embodiment, the chip carrier device 1200 includes a fluid sample adapter 1210, flowcell adapter 1220 and a chip carrier 1230. The fluid sample adapter 1210 fluidically couples to the sample cartridge 1100 by a pair of fluid ports on the sample cartridge; the flowcell adapter 1220 is fluidically coupled to the fluid sample adapter 1210; and the chip carrier 1230 is coupled to the flowcell adapter 220 such that a chip carried in the chip carrier 1230 along with the flowcell adapter 1220 defines the flowcell. Any or all of the adapters or chip carrier of the chip carrier device 1200 are formed from a suitably rigid material such that the carrier device 1200 extends outward from the sample cartridge 1100. In some embodiments, the chip carrier device 200 is supported only by a pair of inlet stubs of the fluid sample tube adapter 1210 fittingly received within the corresponding pair of fluid ports of sample cartridge 1100 and a surrounding flange.

B. Fluid Sample Adapter

FIGS. 10-17 depicts exemplary chip carrier device assemblies and components in accordance with some embodiments. Such device assemblies can include a fluid sample adapter, a flowcell adapter and chip carrier component. As shown in FIG. 11A, the fluid sample adapter 1210 includes two fluid channels or conduits spaced apart and extending within the chip carrier device. The channels are separated and supported by a supporting web structure. The chip carrier device can be fabricated from any material suitable for transport of a fluid sample selected so as to not interfere with processing or analysis of the sample, typically an inert plastic or polymer-based material can be used. In some embodiments, the components of the chip carrier device are formed of polycarbonate, polysulfone, or any suitable material (e.g. any material compatible with an adhesive). In some embodiments, the material can be compatable with a silicone adhesive. In some embodiments, the material used to fabricate the chip carrier device is a transparent or partly translucent material to allow visual observation of sample transport and/or optical detection/monitoring of the fluidic channel through the material.

In some embodiments, the chip carrier device includes a fluid sample adapter configured with the same Luer ports and flange arrangement of the fluidic interface as a typical PCR reaction tube so that the fluid sample adapter can easily interface with sample cartridges. The fluid sample adapter is configured such that the ports connect fluidically to an optional PCR pre-amplification chamber. Alternatively, the amplification chamber could house a filter, an affinity matrix, a magnetic capture zone, or other active area that can be manipulated by the module. Typically, the fluidic pathways are defined in a first substrate and sealed by a second substrate, such as a thin film, similar to the construction of conventional PCR reaction tubes. In some embodiments, the fluid sample adapter also features alignment and assembly bosses as well as mechanical snaps so that a flowcell adapter can be positioned and secured to the reaction tube adapter with ease.

In some embodiments, the length of the fluid sample adapter is about 12 cm, 11 cm, 10 cm, 9 cm, 8 cm, 7 cm, 6 cm, 5 cm, 4 cm, 3 cm, 2 cm, or 1 cm in length. In some embodiments, the fluid sample adapter 210 has a length between 3 to 5 cm, such as about 4 cm from the flange of the fluidic interface 211, and the fluid channels extend in parallel and are separated by about 1 cm. This configuration allows for substantially fluid-tight couplings that are of substantially the same construction as a conventional reaction tube. The fluid-tight couplings of each channel are defined by a stub, each stub being dimensioned to be fittingly received in a corresponding external port of the sample cartridge to facilitate a fluid-tight coupling of the fluid channels with corresponding fluid channels of the chip carrier device. For example, stubs along fluid inlets and outlet 1212, 1214 at the proximal end of the chip carrier device 1200 serve as inlet stubs for flow of the prepared fluid sample into the chip carrier device 1200, while stubs of the flowcell ports 1216', 1218' form fluid-tight couplings to facilitate flow of the prepared fluid sample into the flowcell chamber of the flowcell adapter. In some embodiments, these stubs can have an outside diameter between 2-10 mm, for example, the outside diameter can be 2, 3, 4, 5, 6, 7, 8, 9, or 10 mm. Typically, the outside diameter of the stub is about 3 mm, and extends from the flange a distance of about 2-5 mm, such as about 3 mm, to facilitate fluid-tight coupling. In some embodiments, the inside diameter of each of the one or more channels within any of the components of the chip carrier device can be within a range of 1 mm to 5 mm.

In some embodiments, the fluid sample adapter 1210 includes one or more channels that extend between fluid-tight couplings without any chambers, valves or ports between the proximal and distal ends. In some embodiments, the fluid sample adapter 1210 includes one or more valves, or ports. In some embodiments, the one or more channels can include one or more chambers or regions, which can be used to process or analyze the fluidic sample. For example, the fluid sample adapter can include one or more chambers or regions for thermal amplification of a nucleic acid target in the sample, filtration of the sample, chromatographic separation of the sample, hybridization, and/or incubation of the sample with one or more assay reagents.

Figure 11A:
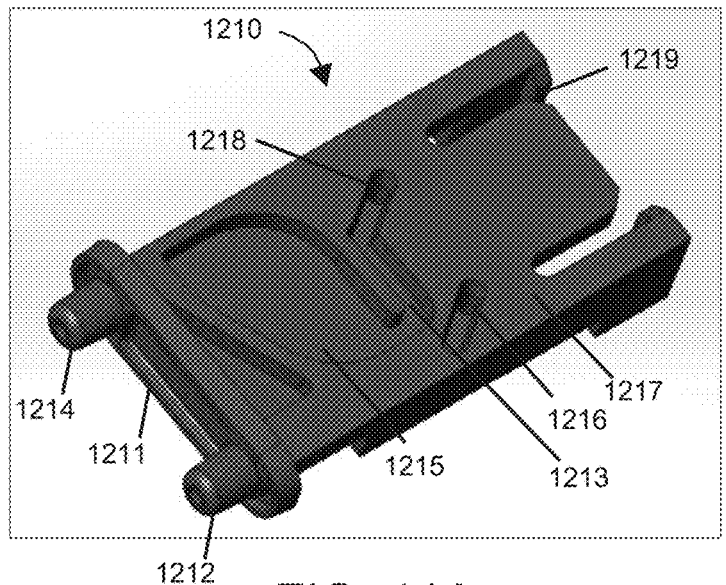
FIGS. 11A-11C illustrate various views of a fluid sample adapter component of a chip carrier device, in accordance with some embodiments.
Figure 11C:
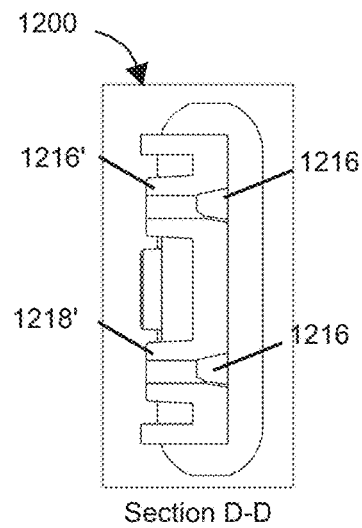

While the fluid tight couplings shown in FIG. 11A includes stubs extending from a flange of the fluidic interface 1210, it is appreciated that various other fluid-tight couplings suitable for use with the invention can be devised as needed to fluidly couple with other types of devices. Non-limiting exemplary fluid type couplings suitable for use with the invention, include, Luer-lock connections, snap-fit connections, friction fittings, click-fit connections, and screw-on connections. Additional types of fluid tight couplings suitable for use with the invention are well known to persons of skill in the art.

Figure 11B:
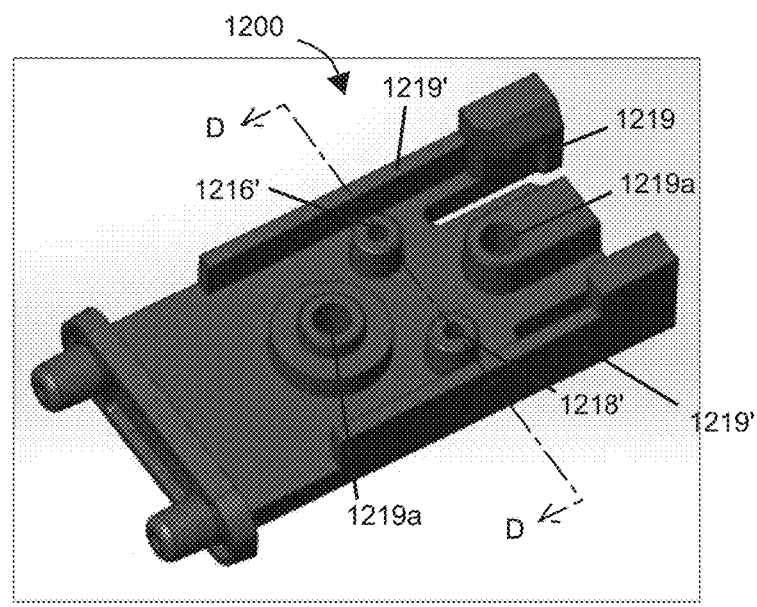

As can be seen in FIGS. 11A-11B, the fluid sample adapter 1210 is defined by one or more planar substrates defining a fluidic path 1213 coupled to a fluidic interface 1211. The fluidic interface 1211 is a structural member which a majority of the planar frame cantilevers. The fluidic interface 1211 can be integrally formed with the planar frame. The fluidic interface 1211 also serves as a mechanical coupling to sample cartridge 100. Fluidic interface 1211 includes a fluidic inlet 1212 and fluidic outlet 1214, which provides a fluidic interface to the sample cartridge device. Each of the fluidic inlet 1212 and fluidic outlet 1214 are fluidically coupled to fluidic path 1213 that is formed in the planar substrate.

In some embodiments, the fluidic path 1213 is defined primarily along one major face of the planar substrate and enclose by a second planar substrate, for example, a thin film heat sealed on the substrate so as to enclose the channels and chambers defined within the substrate. The fluidic path 1213 leads to a flowcell interface that includes a first set of flowcell ports 1216, 1218 extending laterally or traverse to the plane of the adapter, typically perpendicular, so as to fluidically couple with a fluidic path of a flowcell adapter (see FIGS. 12A-5C) coupled to the fluid sample adapter 1210 along a major face thereof. In this embodiment, the flowcell interface includes an inlet flowcell port 1216 and outlet flowcell port 1218, which allow for controlled fluid transport through the chip carrier device 1200 into the flowcell chamber via the fluidic inlet 1212 and fluidic outlet 1214. In this embodiment, the fluidic channels are defined along one major face of the fluid sample adapter 1210 and the flowcell adapter is coupled to an opposing major face. In such embodiments, the first set of ports 1216 and 1218 are defined in the same major face in which the channels are formed, as shown in FIG. 11B. Flowcell ports 1216, 1218 lead to corresponding channels that extend transversely through the adapter and open along an opposing major face within corresponding protruding stubs 1216', 1218', as seen in the sectional view in FIGS. 11B and 11C. These protruding stubs facilitate fluid-tight coupling with corresponding fluid ports in the flowcell adapter when coupled thereto.

While shown as separate components here, it is appreciated that components of the chip carrier device can be formed as integral components. For example, the components depicted in FIGS. 11A-12A can be formed as portions of an integral component.

It should be understood that use of the terms "inlet" and "outlet" do not limit function of any fluid inlets or outlets described herein. Fluid can be introduced and evacuated from both or either. In some embodiments, the fluidic path 1213 is valveless, and thus external increases or decreases in pressures can be applied via the fluidic inlet 1212 and fluidic outlet 1214 by an external system to move fluid within the fluidic path 1213, which extends from the fluidic inlet 1212 to the fluidic outlet 1214. The cross-section of the fluidic path 1213 can be round or rectangular, and can have diameters or widths ranging from about 50 μm to about 2 mm. Typically, the diameters or widths range from about 250 μm to about 1 mm. In this embodiment, the fluidic path 1213 includes a chamber 1215, which is an enlarged portion of fluidic path 1213 dimensioned to contain a substantial portion or an entirety of a fluid sample transported from the sample cartridge to facilitate various processes, including but not limited to flow metering, mixing, pre-amplification, thermal cycling, or any other sample processing desired. It is appreciated that various other components could be incorporated into fluid sample adapter, for example, a valve, filter, window, or any other feature desired.

The fluid sample adapter 1210 further includes one or more coupling and/or alignment features. In this embodiment, the fluid sample adapter includes coupling feature 1219, which here is defined as a notched region that is shaped to receive and a corresponding feature along a distal outside edge of the flowcell adapter so as to couple the flowcell adapter thereto. The coupling feature 1219 can be defined so as to resiliently deflect to receive the flowcell adapter and secure the flowcell adapter when fitted within the recessed notched portion. In this embodiment, the fluid sample adapter further includes alignment feature 1219' that fits into a corresponding alignment feature on the flowcell adapter, which facilitate proper alignment and orientation of the flowcell adapter when coupled thereto to ensure a fluid-tight coupling between the first set of flowcell ports and corresponding fluid ports of the flowcell adapter. In this embodiment, the alignment feature 119' is defined as a circular protrusion with a central hole. It is appreciated that various other coupling features and alignment features could be used (e.g. interfacing contoured regions, snap-fit feature, etc.) and that such features could be separate features or integrated into a single feature. In some embodiments the fluid sample adapter and flowcell adapter could be fixedly secured together by heat sealing, adhesive or any suitable means. In still other embodiments, the fluid sample adapter and flowcell adapter could be integrally formed as a single component.

In some embodiments, the chip carrier device (or at least a partial assembly) is provided pre-attached to a sample cartridge with the fluid-tight couplings coupled with corresponding fluid ports of the cartridge. For example, a sample cartridge may be provided already coupled with the fluid sample adapter 1210 and attached to flowcell adapter such that an end-user can insert any chip within a chip carrier 1230 component and then couple within the chip carrier to the flowcell adapter 1220.

C. Flowcell Adapter

In some embodiments, the chip carrier device includes a flowcell adapter configured with an open chamber that when interfaced with an active area of a chip within the chip carrier, forms an enclosed flowcell chamber to facilitate analysis of the fluid sample with the chip. In some embodiments, the flowcell is configured to fluidly couple with the fluid sample adapter and the chip within the chip carrier. Typically, the flowcell adapter connects to the flowcell chamber through fluid ports located at the top and bottom of the chamber. The chamber is formed by raised lands or ridges that come in contact with the active silicon or glass element used in the detection scheme. The active element is located on the chip carried within the chip carrier and secured to the flowcell by bonding and sealing, which can be accomplished by various means (e.g. using epoxy preforms, dispensed epoxy or other adhesives, a gasket, a gasket with adhesive, mechanical features, or various other means). The purpose of the flowcell adapter is to create a complete flowcell chamber, bounded by the detection surface on one side and the flowcell adpater on the remaining sides. The flowcell adapter also features alignment and assembly bosses as well as mechanical snaps so that the flowcell adapter can be positioned and secured to the fluid sample adapter with ease.

Figure 12A:
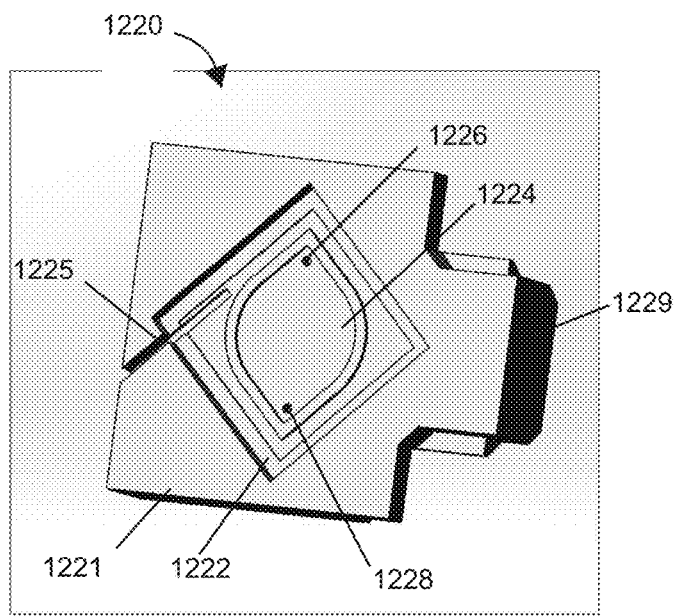
FIGS. 12A-12C illustrate various views of a flowcell adapter component of a chip carrier device, in accordance with some embodiments.
Figure 12C:
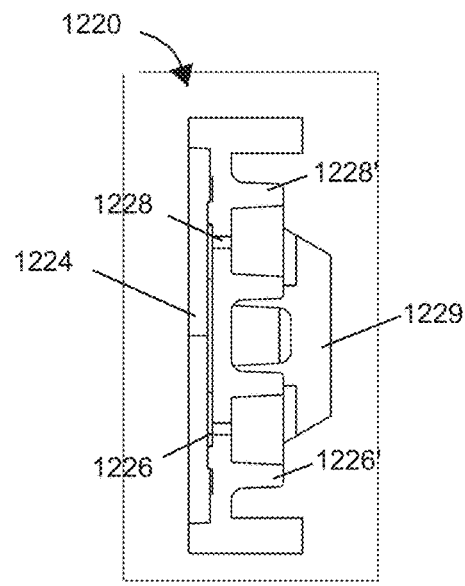
Figure 12B:
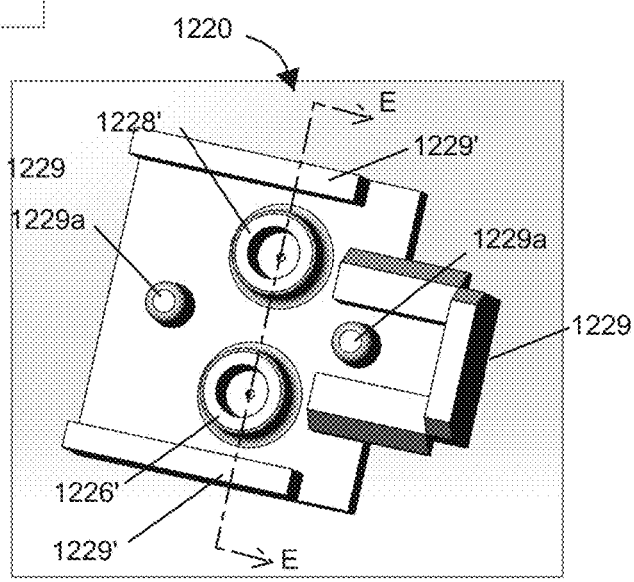

FIGS. 12A-12C illustrate detailed views of an example flowcell adapter 1220 for use with the chip carrier device 1200. In this embodiment, the flowcell adapter 1220 is configured to fluidly couple with the fluid sample adapter 1210 shown in FIG. 11A. As shown in FIG. 12A, flowcell adapter 1220 is a planar substrate 1221 formed of a rigid material (e.g. polymer or any suitable material) having a recessed portion 1222, an open flowcell chamber 1224, channel 1225, and flowcell ports 1226, 1228 defined therein. Flowcell adapter 1220 is configured to couple with the fluid sample adapter 1210 along one major face and with a chip with the chip carrier along an opposing major face thereof. The open chamber 1224 forms an enclosed flowcell chamber with the active area of the chip when the chip is engaged within the correspondingly shaped recess 1224. The top and bottom flowcell ports 1226, 1228 fluidly couple the flowcell chamber with the set of flowcell ports of the fluid sample adapter 1210 so as to allow flow of fluid sample into or out of the flowcell chamber upon controlled pressurization of the inlet and outlet 1212, 1214 of the chip carrier device 1200 fluidly coupled with the sample cartridge 1100. Channel 1225 extends into the flowcell chamber and allows for any of: access into the flowcell chamber, injection of materials into the flowcell chamber, capture of any bubbles within the flowcell chamber, and pressure regulation.

As can be seen in FIG. 12B and the sectional view in FIG. 12C, each of fluid ports 1226 and 1228 extend to the opposing major face of flowcell adapter 1220 and open within a recessed hole or chamber of a boss 1226', 1228' so as to form a fluid-tight coupling with the ports within the corresponding cylindrical protrusions or stubs of the fluid sample adapter. It is appreciated that various other fluid-tight couplings could be used to fluidically couple the flowcell adapter 1220 to the fluid sample adapter 1210.

Flowcell adapter 1220 further includes one or more coupling and/or alignment features. In this embodiment, the flowcell adapter includes a coupling feature 1229, which here is defined as a tab region that is shaped to be resiliently received within a corresponding notched region 1219 of the fluid sample adapter 1210. Flowcell adapter includes raised ridges 1229' along each side edge that engage corresponding features (e.g. groove, ridge, etc.) of the fluid sample adapter to further assist in alignment and coupling of the adapters. In this embodiment, the flowcell adapter further includes alignment features 1229a that fit into corresponding features on the fluid sample adapter to ensure proper alignment and orientation of the flowcell adapter when coupled thereto so as to ensure fluid-tight coupling between the first set of ports and corresponding fluid ports of the flowcell adapter. In this embodiment, the alignment features 1229a are each defined as a circular protrusion that fit into corresponding alignment holes 1219a of fluid sample adapter 1210. It is appreciated that various other coupling features and alignment features could be used (e.g. interfacing contoured regions, snap-fit feature) and that such features could be separate or integrated into a single feature. In some embodiments, the fluid sample adapter and flowcell adapter could be fixedly secured together by heat sealing, adhesive or any suitable means. In some embodiments, the fluid sample adapter and flowcell adapter could be integrated into a single component.

D. Chip Carrier

Figure 13A:
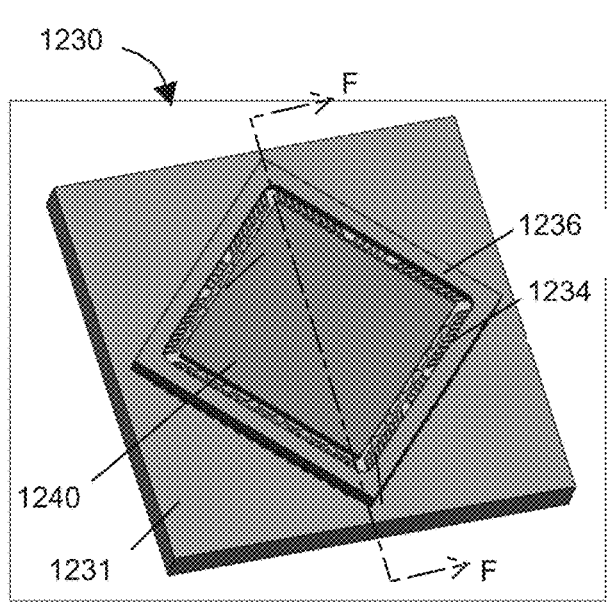
FIGS. 13A-13C illustrate various views of a chip carrier component of a chip carrier device, in accordance with some embodiments.
Figure 13C:
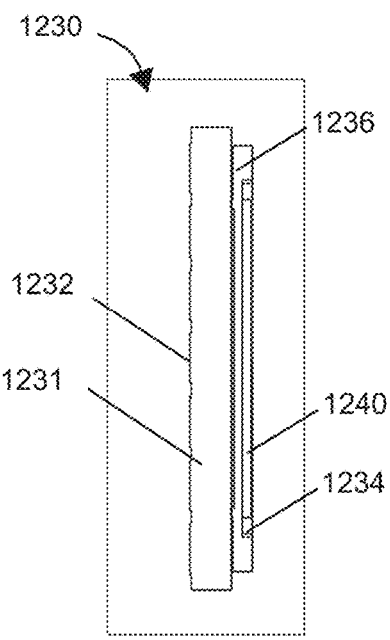
Figure 13B:
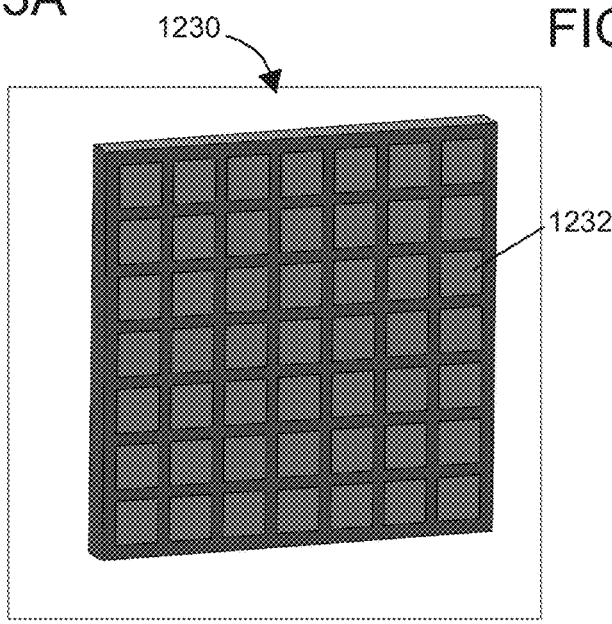

FIGS. 13A-13C illustrate detailed views of a chip carrier 1230 of the chip carrier device, in accordance with some embodiments. As can be seen in FIG. 13A, chip carrier 1230 is defined within a substantially planar substrate 1231 that includes a contoured region 1236 dimensioned to receive the chip and configured with multiple electrical contacts 1234 arranged to electrically connect with corresponding contacts of the chip when received within. In this embodiment, the contoured region 1236 is square and electrical contacts 1234 configured to receive and couple with a chip, such as shown in FIG. 13A. Contoured region 1236 includes a raised ridge along the perimeter thereof to engage a corresponding portion of the flowcell adapter and effectively seal the chip within the chip carrier device. The raised lands or ridge around the open flowcell chamber engage an active surface of the chip so as to form an enclose flowcell chamber, as described above.

The electrical contacts 123 are electrically coupled with corresponding contact array 1232 of an electrical interface board disposed on an opposite side of the chip carrier 1230, as shown in FIG. 13B. The contact array 1232 is defined as an array of enlarged contact pads arranged to facilitate contact with corresponding electrical contacts, typically pogo pins, of the instrument interface 1300 of the module. FIG. 13C shows a cross sectional view of chip carrier 1230 with a chip carried and electrically coupled within receptacle 1236. Wire bonds are not shown in this view. The electrical interface board can also host passive and active electronic components in addition to those of the chip carrier as needed for various other tasks. For example, such components could include any components needed for signal integrity, amplification, multiplexing or other such tasks.

E. Chip

In some embodiments, if the chip 1240 includes a silicon sensor element, it can be bonded within the chip carrier 1230 and wire bonds applied to connect the silicon element electrically to the chip carrier 1230. In other embodiments, the chip can merely be pressed into the recess such that the friction fit provides sufficient electrical contact between corresponding contacts.

In some embodiments, the chip 1240 is a semiconductor diagnostic chip, such as any of those described herein. While semiconductor diagnostic chips are preferred, it is appreciated that the concepts described herein are applicable to any type of chip suitable for use in performing processing or analysis of a fluid sample.

It is appreciated that the chip carrier device can be configured for use with any type of chip, including but not limited to CMOS, ISFET, bulk acoustic, non-bulk acoustic chips, piezo-acoustic, and pore array sensor chips. Further, the chip can be adapted for use in an open package to any of the many JDEC standards, including but not limited to QFN, dual in-line, and BGA array. Alternatively, the chip can be mounted directly to the PCB as a chip-on-board assembly.

F. Assembly and Use of Chip Carrier Device

Figure 14A:
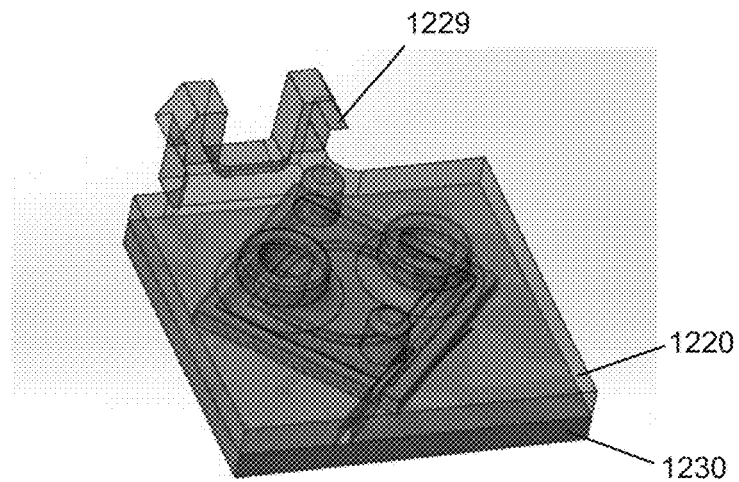
FIGS. 14A-14B illustrate a chip carrier component coupled with a flowcell adapter component, in accordance with some embodiments.
Figure 14B:
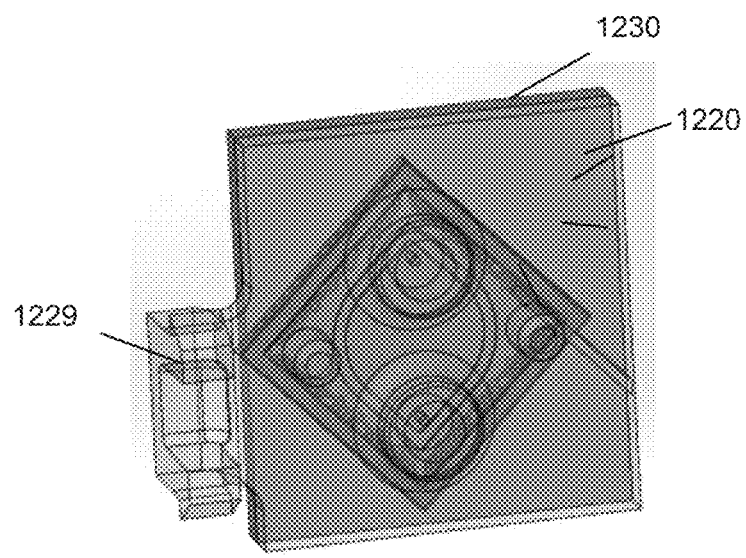

FIGS. 14A and 14B illustrate sectional views of the assembled chip carrier device 200, along the same sectional view as shown in the individual component section views. Each of the components of the chip device, the fluid sample adapter 1210, the flowcell adapter 1220 and the chip carrier 1230, can be seen interfaced via one or more coupling features such that the fluid channels of the fluid sample adapter 1210 are aligned and fluidically coupled with the flowcell of the flowcell adapter 1220 to facilitate processing or analysis of the fluid sample with the semiconductor chip carried within the chip carrier adjacent the flowcell. The electrical contacts 1232 of the chip carrier 1230 face outward for engagement with corresponding contacts of the instrument interface 1300 to facilitate control of the semiconductor chip with the module, as described above.

Figure 15A:
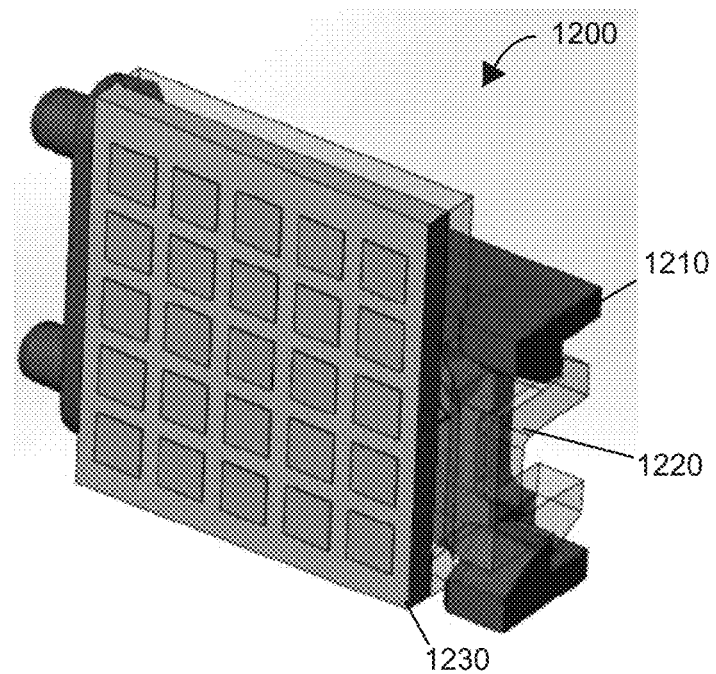
FIGS. 15A-15C illustrate various views of an assembled chip carrier device, in accordance with some embodiments.
Figure 15B:
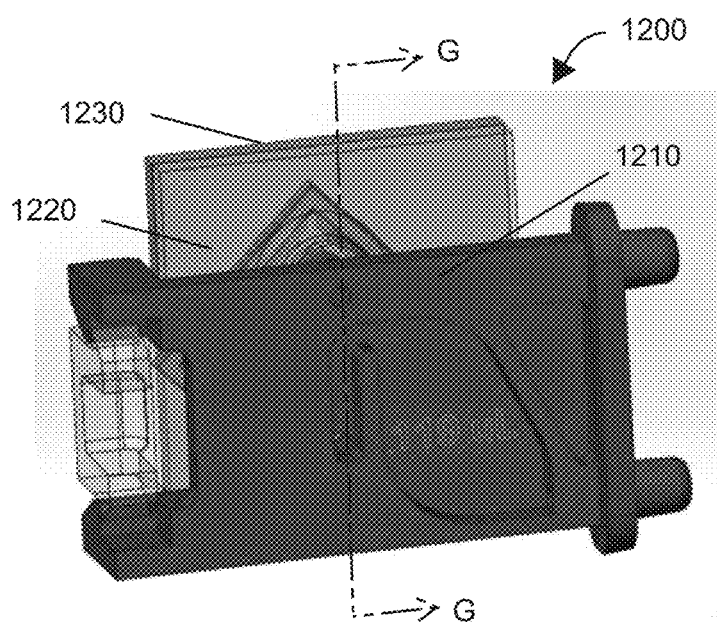
Figure 15C:
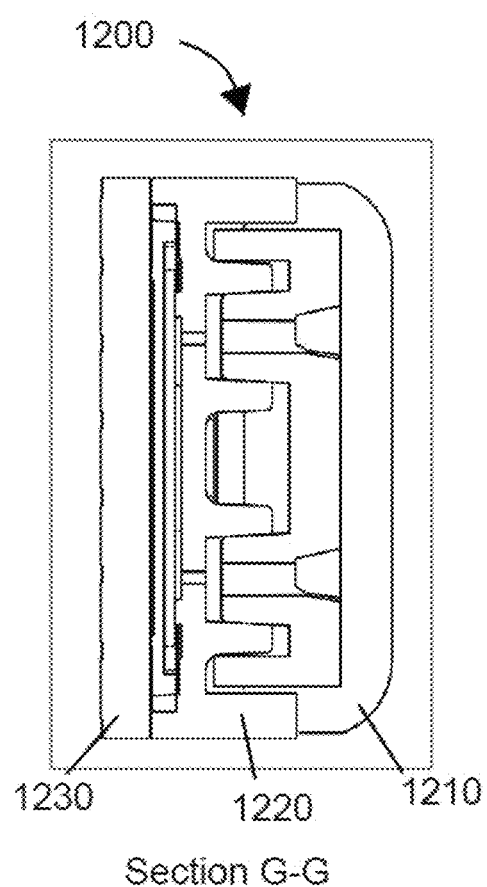

FIGS. 14A and 14B illustrate a detail view of the chip carrier interface 1230 fluidically coupled with the flowcell adapter 1220. FIGS. 15A and 15B illustrate detail views of the fully assembled chip carrier device 200, before fluidically coupling with the sample cartridge 100 and FIG. 15C illustrates a cross-sectional view of the device. As shown, the device is configured such that a semiconductor chip 1240 within the carrier 1230 is exposed to the flowcell of the flowcell adapter 1220. While these components are coupled and aligned with removable coupling features to allow an end-user to assemble any chip within the device, it is appreciated that such components could be coupled with non-removable coupling feature or permanently bonded, such as by an adhesive or heat sealing. It is further appreciated that the components could be defined to receive the chip in various other ways, for example, the components could be hinged or partly attached along one side. FIGS. 15A and 15B illustrate detail views of the chip carrier device 200, before fluidically coupling with the sample cartridge 100 and FIG. 15C illustrates a cross-.

Figure 16:
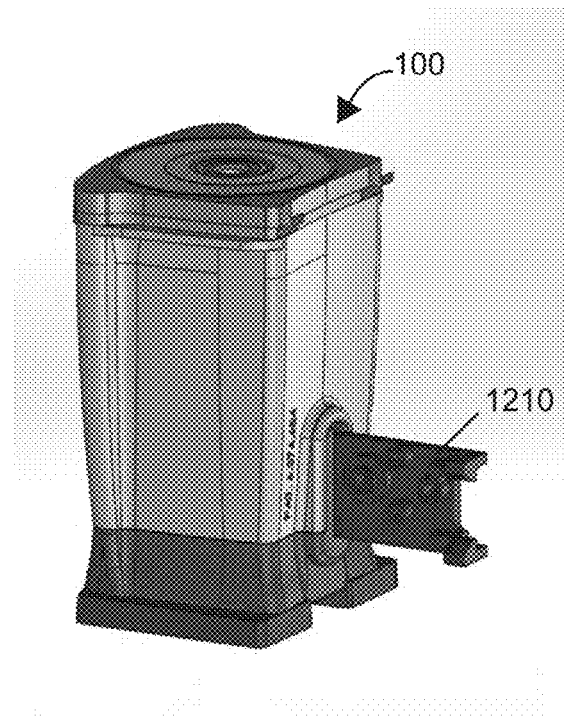
FIG. 16 illustrates a sample cartridge coupled with a fluid sample adapter component of a chip carrier device and FIG. 17 illustrates an assembled chip carrier device coupled with the sample cartridge, in accordance with some embodiments.
Figure 17:
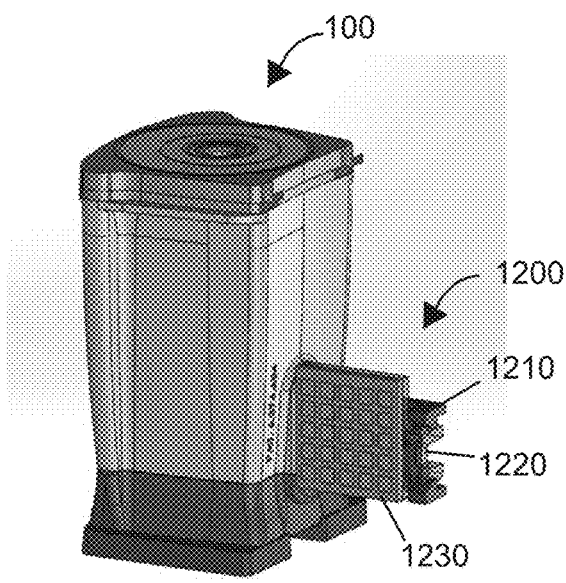

FIG. 16 illustrates a detail view of the sample cartridge coupled with a fluid sample adapter 1210 fluidically attached to the sample cartridge 1100 via the fluidic interface 1211 (the other components of the chip carrier device have been omitted for improved visibility). FIG. 17 shows the fluid sample adapter 1210 coupled with the flowcell adapter 1220 and the chip carrier 1230 within the overall chip carrier device 1200, a chip (not shown) carried within the chip carrier 1230. An end-user can assemble the chip carrier device and couple with the sample cartridge in this fashion, before placing the sample cartridge containing a fluid sample within the module for processing and analysis. FIGS. 18A and 18B illustrate detail views of the chip carrier device 200, before fluidically coupling with the sample cartridge 100.

FIG. 18 illustrates alternative detection modes configured for use with a sample cartridge, in accordance with some embodiments. Embodiment 0 depicts a sample cartridge 100 fluidically coupled with a reaction tube 110. Embodiment 1 depicts a sample cartridge 100 fluidically coupled with a fluidic bridge 120 adapted to facilitate transport of the fluid sample to an external device for further processing or analysis. Embodiment 2 depicts a sample cartridge 100 fluidically coupled with a chip carrier device 200 carrying a semiconductor detection chip, as described herein. Embodiment 3 depicts an alternative construction of a chip carrier device 200' carrying a semiconductor detection chip in accordance with the concepts described herein. In this embodiment, certain components of the chip carrier device have been eliminated by utilizing either a chip-on-board and epoxy preform structure or vertical interconnect access such as a bare through-silicon-via ("TSV"), or glass integrated into a molded carrier tube. This design reduces the number of components, thereby reducing the complexity and cost of the chip carrier device to allow for high volume production methods. Further, this design concept allows for a plug-n-play approach, allowing the system to be used a platform to readily accept and utilize existing "lab on a chip" devices in a more cost effective manner. While in these embodiments, the chip carrier devices are configured to carry the detection chip in a vertical orientation, it is appreciated that various other configurations and orientations could be utilized. In some embodiments, utilizing a chip carrier device that orients the detection chip vertically is advantageous as it further reduces the size of the overall chip carrier device so as to fit within a conventional sample processing module modified with an instrument interface for controlling analysis with the chip.

IV. Methods of Sample Processing Utilizing Chip Carrier Device

Figure 19:
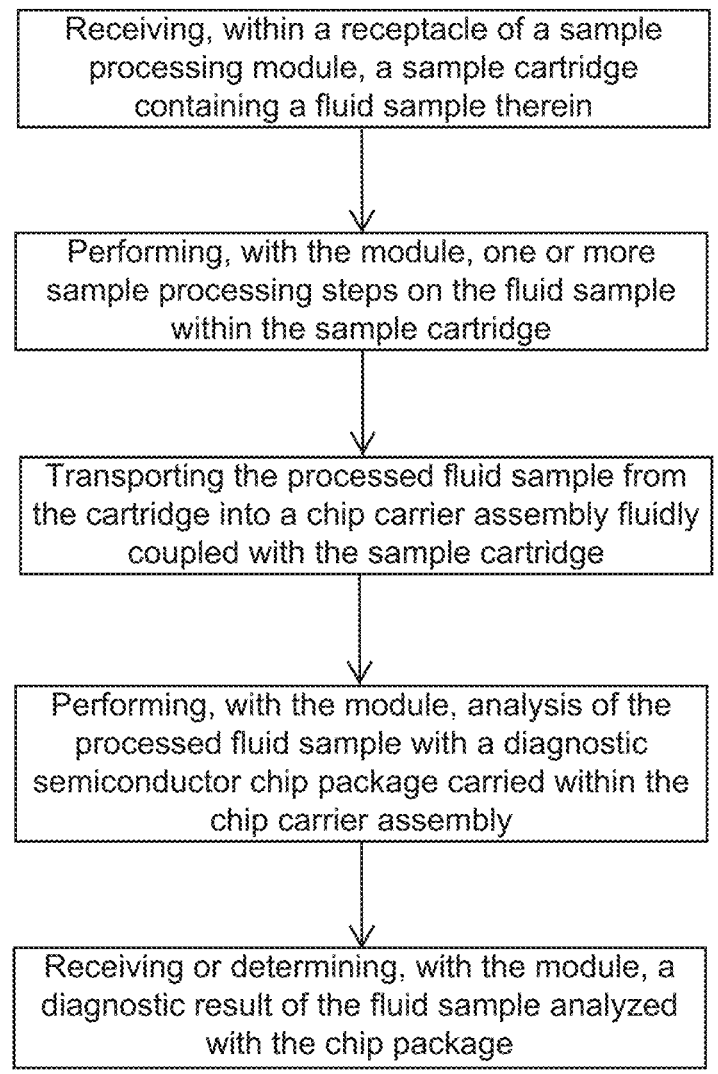
FIGS. 19-20 illustrate methods of processing a sample with a semiconductor chip utilizing sample processing in a sample cartridge, in accordance with some embodiments.
Figure 20:
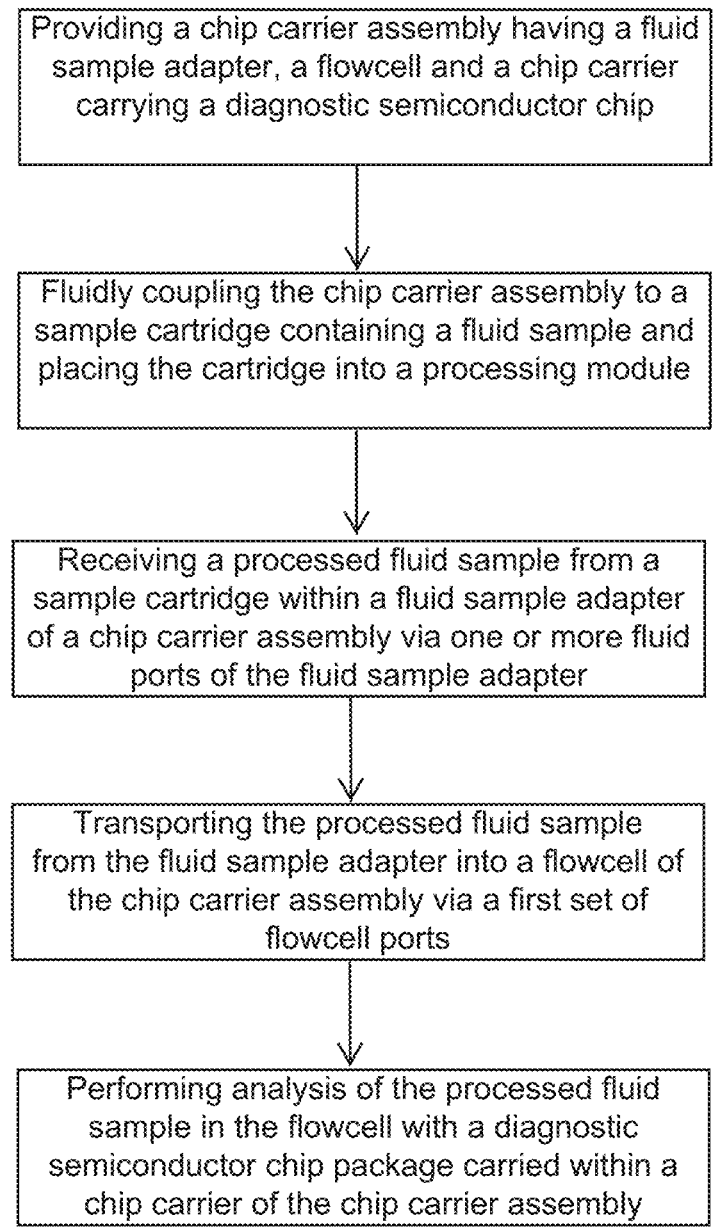

FIGS. 19-20 illustrates exemplary methods of processing a fluid sample with a semiconductor chip utilizing a chip carrier device and a sample cartridge, in accordance with some embodiments.

FIG. 19 depicts a method that includes steps of: receiving, within a receptacle of a sample processing module, a sample cartridge containing a fluid sample therein. Such a module can be the module described herein or any such module or similar modules known in the art capable of receiving and processing a sample cartridge as described herein. The method further includes steps of: performing, with the module, one or more sample processing steps on the fluid sample within the sample cartridge and transporting the processed fluid sample from the cartridge into a chip carrier device fluidly coupled with the sample cartridge. Transporting of the processed fluid sample can be performed through controlled pressurization through fluid ports of the sample cartridge through which the carrier device is attached. The method further includes performing, with the module, analysis of the processed fluid sample with a semiconductor chip carried within the chip carrier device. In some embodiments, a diagnostic result of the fluid sample analyzed with the chip is received by the module or determined by the module through the instrument interface.

FIG. 20 depicts a method that includes steps of: providing a chip carrier device having a fluid sample adapter, a flowcell and a chip carrier carrying a semiconductor chip. Such components could be as described above or could include various modification or additional adapters as would be understood by one of skill in the art. The methods can further include: fluidly coupling the chip carrier device to a sample cartridge containing a fluid sample and placing the cartridge into a processing module and receiving a processed fluid sample from a sample cartridge within a fluid sample adapter of a chip carrier device via one or more fluid ports of the fluid sample adapter. The methods can further include transporting the processed fluid sample from the fluid sample adapter into a flowcell of the chip carrier device via a first set of flowcell ports. In some embodiments, the chip carrier device is valveless such that receiving and transporting the fluid sample there through is performed by controlled pressurization of one or more fluid ports of the sample cartridge through which the chip carrier device is fluidically coupled. The methods can further include: performing analysis of the processed fluid sample within the flowcell with a diagnostic semiconductor chip carried within a chip carrier of the chip carrier device.

As noted previously, in one aspect, the adapter allows for interfacing with a chip that is not within a conventional chip package (e.g. a chip mounted within a leaderframe wire bonded, potted in epoxy), thereby providing improved ease of use and assembly, further reduced size and integration as compared to conventional approaches. In some embodiments, the chip carrier device can include a set of standard open chip carriers into which the chip may be packaged. In other embodiments, the device can include a chip-on-board packaging that allows the chip to be inserted and interfaced with a flowcell, as described above.

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system comprising:
a sample cartridge configured to hold an unprepared fluid sample, the sample cartridge comprising a plurality of processing chambers fluidically interconnected by a moveable valve body;
a sample processing module configured for performing sample preparation and analytical testing of the fluid sample within the sample cartridge, the module having a cartridge receiver adapted to receive and removably couple with the sample cartridge and a motor configured to drive movement of the moveable valve to perform sample preparation of the sample within the sample cartridge, wherein the sample processing module further includes an instrument interface having an array of electrical contacts; and
a chip carrier device having a fluidic interface configured for fluidically coupling with the sample cartridge, the fluidic interface being in fluid communication with a flowcell chamber of the chip carrier device in communication with a diagnostic chip when carried within a carrier portion of the chip carrier device, wherein the carrier portion is configured for supporting the diagnostic chip, the diagnostic chip being a no-leads chip, and includes an electrical interface configured for powering and communicating with the diagnostic chip when supported within the carrier portion of the chip carrier device when operably coupled to the sample cartridge;
wherein the instrument interface is electrically connected with the diagnostic chip when supported within chip carrier device fluidically coupled to the sample cartridge received within the sample processing module so as to perform analytical testing of the fluid sample utilizing the diagnostic chip with the sample processing module,
wherein the chip carrier device comprises:
a fluid sample adapter portion having the fluidic interface configured for fluidically coupling with the sample cartridge, the fluidic interface being in fluid communication with a first set of ports of the fluid sample adapter via a fluidic path;
a flowcell adapter portion integral with or coupleable with the fluid sample adapter, the flowcell adapter defining the flowcell chamber in fluid communication with the fluid sample adapter when coupled thereto via one or more flowcell ports of the flowcell adapter; and
a chip carrier coupleable with the flowcell adapter, the chip carrier including the carrier portion configured for supporting a no-leads chip and the electrical interface electrically connected to the carrier portion so as to power the chip when supported within the carrier portion, and
wherein the chip carrier device is configured for coupling with a plurality of electrical contacts of the chip on a first side thereof and the electrical interface is disposed on an opposing side.

2. The system of claim 1, wherein the fluid sample adapter and the flowcell adapter are defined as an integrally formed component.

3. The system of claim 1, wherein each of the fluid sample adapter, the flowcell adapter and the chip carrier are substantially planar and stacked in parallel when coupled together within the system.

4. The system of claim 1, wherein the cartridge receiver of the module includes a cartridge interface configured to interface with one or more mechanical components of the module to perform sample processing within the sample cartridge.

5. The system of claim 4, wherein the one or more mechanical components are configured to move a valve body of the sample cartridge to change fluidic interconnections between a plurality of sample processing chambers of the sample cartridge so as to perform sample processing therein.

6. The system of claim 1, wherein fluid sample adapter is configured such that the fluidic interface includes one or more fluid-tight couplings adapted to couple with one or more sample ports of the sample cartridge.

7. The system of claim 6, wherein the one or more fluid-tight couplings of the fluidic interface include a fluidic inlet port and a fluidic outlet port adapted to couple with a corresponding pair of ports on the sample cartridge.

8. The system of claim 1, wherein the one or more flowcell ports of the flowcell adapter are positioned to sealingly interface with the first set of ports of the fluid sample adapter.

9. The system of claim 8, wherein the one or more flowcell ports of the flowcell adapter comprise an inlet and an outlet port positioned to interface with a first and second port of the first set of ports of the fluid sample adapter.

10. The system of claim 1, wherein the chip carrier is substantially planar and the carrier portion includes an interface configured for any of the following types of chips: CMOS, ISFET, bulk acoustic, non-bulk acoustic, piezo-acoustic and pore array sensor chips.

11. The system of claim 1, wherein the electrical interface includes a plurality of electrical contacts electrically connected to the carrier portion so as to electrically couple with the plurality of contacts of the chip when carried within the carrier portion.

12. The system of claim 11, wherein the electrical interface includes a printed circuit board on which the plurality of contacts are defined.

13. The system of claim 11, wherein the module further comprises a chip control unit, and wherein the plurality of contacts of the electrical interface are arranged so as to electrically couple with the array of electrical contacts of the instrument interface of the chip control unit of the module.

14. The system of claim 1, further including:
a semiconductor diagnostic detection chip coupleable within the chip carrier device, wherein the chip includes one or more sample preparation features.

15. The system of claim 14, wherein the one or more sample preparation features are configured to perform any of electrophoretic-based separation; fluidic pumping; and electrowetting-based fluidic manipulation.

16. The system of claim 1, wherein the sample cartridge and the chip carrier device are configured so that the chip is oriented vertically with an active area of the chip extending in a vertical direction when the chip is supported and electrically coupled within the chip carrier device while fluidically coupled to the cartridge.

17. The system of claim 1, wherein the first set of ports of the fluid sample adapter comprise an inlet and outlet of the fluidic path by which fluid sample is transported to an active area of the chip when supported and electrically coupled within the chip carrier device.

18. The system of claim 1, wherein the chip carrier device includes only a single pair of ports, the single pair of ports being the first set of ports.

19. The system of claim 1, wherein the cartridge receiver of the sample processing module is adapted to receive and removably couple with the sample cartridge holding an unprepared sample, the sample cartridge comprising a plurality of processing chambers fluidically interconnected by one or more mechanisms, wherein the cartridge receiver further includes:
a cartridge interface unit configured for moving the valve body to change fluidic interconnections between the plurality of sample processing chambers,
a pressure interface unit for applying pressure to move fluid among the plurality of processing chambers according to position of the valve body,
a sample preparation controller configured to electronically communicate with the assay processing device and configured to control the cartridge interface unit and pressure interface unit to process the unprepared sample into a prepared sample within the sample cartridge, and
a chip control unit component having the instrument interface and being configured to perform analysis of the sample with the chip carried within the chip carrier device via the instrument interface.

20. The system of claim 19, wherein the chip control unit further includes one or more active components configured for signal integrity, signal amplification, multiplexing or any combination thereof.

21. The system of claim 19, wherein the sample processing module further comprises:
a processor unit configured to perform an analysis of a fluid sample exposed to an active element of the diagnostic chip supported in the chip carrier device via the plurality of contacts of the instrument interface.

22. A system comprising:
a sample cartridge configured to hold an unprepared sample, the sample cartridge comprising a plurality of processing chambers fluidically interconnected by a moveable valve body;
a sample processing module having a cartridge receiver adapted to receive and removably couple with the sample cartridge and a motor configured to drive movement of the moveable valve to perform sample preparation of the sample within the sample cartridge;
a chip carrier device configured for supporting a diagnostic chip therein;
a fluidic interface of the chip carrier device configured for fluidically coupling with the sample cartridge and supporting the chip carrier device in a vertical orientation in a chip carrier portion of the chip carrier device, the fluidic interface being in fluid communication with a flowcell chamber of the chip carrier portion of the chip carrier device in communication with an active area of the diagnostic chip when supported therein; and
an electrical interface having a plurality of electrical contacts that are electrically connected with the diagnostic chip when supported within the carrier portion of the chip carrier device while fluidically coupled to the sample cartridge so as to perform diagnostic detection by the diagnostic chip when supported in the chip carrier device by the sample processing module in addition to sample preparation within the sample processing module,
wherein the chip carrier device is configured for coupling with a plurality of electrical contacts of the chip on a first side thereof and the electrical interface is disposed on an opposing side.

23. The system of claim 22, wherein the electrical interface includes an instrument interface board configured to move or pivot toward the chip carrier device so as to securely engage corresponding electrical contacts electrically connected to the chip when the sample cartridge coupled with the chip carrier device is received within the sample processing module.

24. The system of claim 22, wherein the plurality of electrical contacts of the instrument interface comprise pogo pins that resiliently engage electrical contact pads electrically connected with the diagnostic chip.

25. The system of claim 22, wherein the chip carrier device includes removably coupling features that secured the diagnostic chip when supported within the chip carrier device to facilitate processing of the diagnostic chip and allow removal of the diagnostic chip after testing is complete.

26. The system of claim 22, wherein the fluidic interface and the chip carrier portion, and flowcell chamber are formed as one integral component.

* * * * *